US012739860B2

(12) United States Patent
Ryu et al.

(10) Patent No.: US 12,739,860 B2
(45) Date of Patent: Sep. 15, 2026

(54) RESOURCE ALLOCATION MODE 1 OPERATION IN FR2 SIDELINK

(71) Applicant: QUALCOMM Incorporated, San Diego, CA (US)

(72) Inventors: Jae Ho Ryu, San Diego, CA (US); Kazuki Takeda, Minato-ku (JP); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 18/350,709

(22) Filed: Jul. 11, 2023

(65) Prior Publication Data

US 2025/0024471 A1 Jan. 16, 2025

(51) Int. Cl.
*H04W 72/40* (2023.01)
*H04W 72/1263* (2023.01)

(52) U.S. Cl.
CPC ....... *H04W 72/40* (2023.01); *H04W 72/1263* (2013.01)

(58) Field of Classification Search
CPC .......................... H04W 72/40; H04W 72/1263
See application file for complete search history.

(56) References Cited

U.S. PATENT DOCUMENTS 12,089,202 B2 * 9/2024 Sun .................... H04W 72/542
2013/0040677 A1 2/2013 Lee et al.
2015/0023267 A1 1/2015 Lim et al.
2021/0136783 A1 * 5/2021 Fakoorian ............ H04W 76/14
2022/0006688 A1 1/2022 Ryu et al.
2023/0171625 A1 * 6/2023 Ma ...................... H04W 72/542 370/252
2024/0188181 A1 * 6/2024 Han ..................... H04W 72/40

FOREIGN PATENT DOCUMENTS

CN 111586649 A 8/2020

OTHER PUBLICATIONS

Partial International Search Report—PCT/US2024/035591—ISA/EPO—Oct. 22, 2024.

(Continued)

*Primary Examiner* — Won Tae C Kim
(74) *Attorney, Agent, or Firm* — Procopio, Cory, Hargreaves & Savitch LLP

(57) ABSTRACT

A UE receives, from a network entity, an allocation of resources for a sidelink transmission, the allocation of resources including an indication of a destination identifier (ID). The UE transmits the sidelink transmission to a second UE based on the allocation of resources for the sidelink transmission and the destination ID associated with the second UE. A UE receives, from a first UE, a request to form a connection for sidelink communication. The UE measures at least one colliding sidelink transmission from at least one additional UE interfering with a sidelink transmission from the first UE and transmits, to a network entity, a sidelink collision report indicating the measured at least one colliding sidelink transmission from the at least one additional UE. The UE communicates, with the first UE, via the sidelink communication based on an allocation of resources for the sidelink transmission after the sidelink collision report.

24 Claims, 20 Drawing Sheets

(56) References Cited

OTHER PUBLICATIONS

International Search Report and Written Opinion—PCT/US2024/035591—ISA/EPO—Jan. 17, 2025.

3GPP TS 38.331: "3rd Generation Partnership Project, Technical Specification Group Radio Access Network, NR, Radio Resource Control (RRC) protocol specification (Release 17)", 3GPP TS 38.331 V17.5.0, Jun. 2023, pp. 1-1325,. Section 6.3.5, 5.8.3.1, pp. 417-422, "Sidelink UE Information NR" from 6.2.2.

* cited by examiner

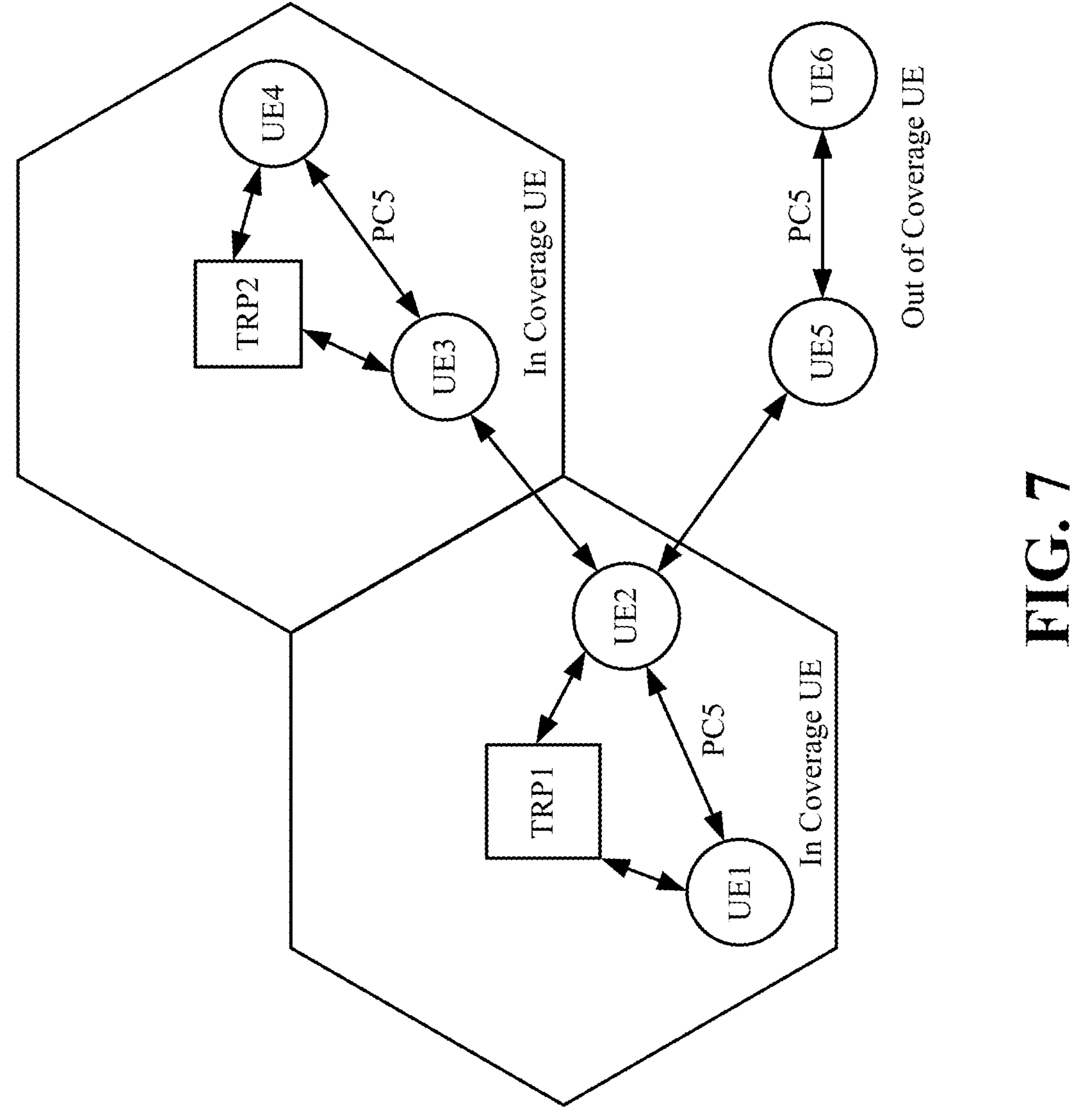
FIG. 7

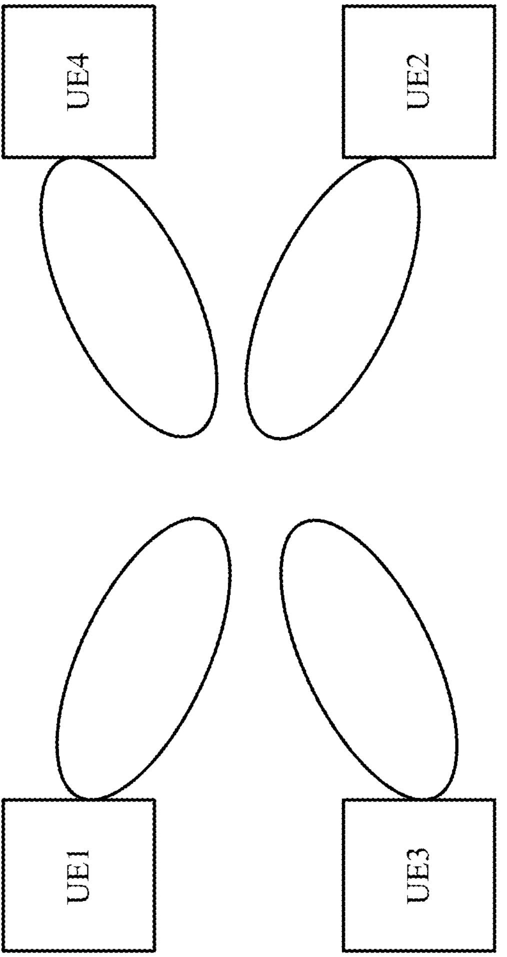
UE4
UE2
UE1
UE3
FIG. 9
900

1200

1800

RESOURCE ALLOCATION MODE 1 OPERATION IN FR2 SIDELINK

TECHNICAL FIELD

The present disclosure relates generally to communication systems, and more particularly, to a configuration for resource allocation for sidelink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first UE. The device may be a processor and/or a modem at a first UE or the first UE itself. The apparatus receives, from a network entity, an allocation of resources for a sidelink transmission, the allocation of resources including an indication of a destination identifier (ID). The apparatus transmits the sidelink transmission to a second UE based on the allocation of resources for the sidelink transmission and the destination ID associated with the second UE.

In an aspect of the disclosure, a method, a computer-readable medium, and an apparatus are provided. The apparatus may be a device at a second UE. The device may be a processor and/or a modem at a second UE or the second UE itself. The apparatus receives, from a first UE, a request to form a connection for sidelink communication. The apparatus measures at least one colliding sidelink transmission from at least one additional UE interfering with a sidelink transmission from the first UE. The apparatus transmits, to a network entity, a sidelink collision report indicating the measured at least one colliding sidelink transmission from the at least one additional UE. The apparatus communicates, with the first UE, via the sidelink communication based on an allocation of resources for the sidelink transmission after the sidelink collision report.

In an aspect of the disclosure, a method, a computer-readable medium, and an apparatus are provided. The apparatus may be a device at a network entity. The device may be a processor and/or a modem at a network entity or the network entity itself. The apparatus schedules an allocation of resources for sidelink transmission based on at least one of a destination identifier (ID) or a sidelink collision report for the sidelink transmission. The apparatus provides, to a first user equipment (UE), the allocation of resources for the sidelink transmission.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a diagram illustrating an example of a sidelink communication system.

FIG. 9 is a diagram illustrating an example of multiple sidelink transmissions.

DETAILED DESCRIPTION

Figure 1:
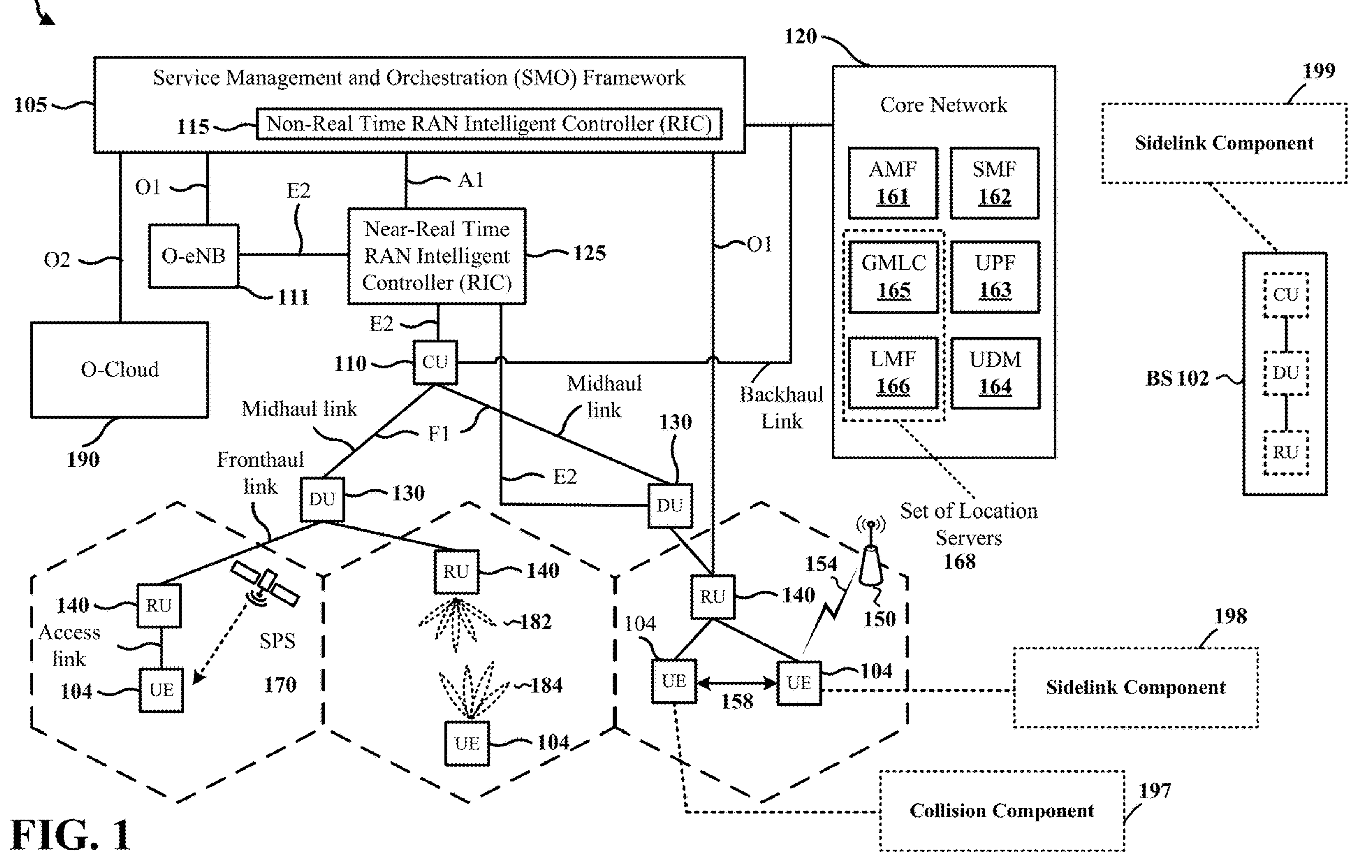
FIG. 1 is a diagram illustrating an example of a wireless communications system and an access network.

In wireless communications systems, for example sidelink communication systems, a Mode 1 and Mode 2 resource allocation configuration may be utilized. In a Mode 1 resource allocation configuration, a base station may allocate resources to a transmitting UE for sidelink data channel transmission. In a Mode 2 resource allocation configuration, the transmitting UE 612 may perform resource allocation autonomously, on its own, for sidelink transmission with the receiving UE.

In FR1, sidelink UEs may transmit and receive PSCCH/PSSCH with an omni-directional antenna. Sidelink transmission by a sidelink UE may be received by all sidelink UEs in the same area. The base station may schedule sidelink transmissions from multiple sidelink UEs with orthogonal resources, such as in different slots or sub-channels to avoid collision among sidelink transmissions. In FR2 sidelink operation, sidelink UEs transmit and receive sidelink transmission with a beam. A beam pair may be established/maintained with a sidelink UE having a unicast connection. For parallel scheduling of multiple SL transmissions in the same slot/sub-channel, the network may know mutual collision between sidelink transmissions among different UE pairs. It would be beneficial for the network to control beamforming of sidelink transmission to increase the opportunity of scheduling of parallel transmission with beamformed SL transmission/reception in FR2.

Aspects presented herein provide a configuration for an enhanced resource allocation for sidelink mode 1 operation. For example, the configuration may allow for a network to schedule multiple sidelink transmissions in a same slot and subchannel. The network may schedule the multiple sidelink transmissions based on at least one of a destination ID or a sidelink collision report for the sidelink transmission. The network may obtain information related to the destination ID from a transmitting UE, and may obtain information related to the sidelink collision report from a receiving UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 407, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a collision component 197 configured to receive, from a first UE, a request to form a connection for sidelink communication; measure at least one colliding sidelink transmission from at least one additional UE interfering with a sidelink transmission from the first UE; transmit, to a network entity, a sidelink collision report indicating the measured at least one colliding sidelink transmission from the at least one additional UE; and communicate, with the first UE, via the sidelink communication based on an allocation of resources for the sidelink transmission after the sidelink collision report.

Referring again to FIG. 1, in certain aspects, the UE 104 may comprise a sidelink component 198 configured to receive, from a network entity, an allocation of resources for a sidelink transmission, the allocation of resources including an indication of a destination ID; and transmit the sidelink transmission to a second UE based on the allocation of resources for the sidelink transmission and the destination ID associated with the second UE.

Referring again to FIG. 1, in certain aspects, the base station 102 may comprise a sidelink component 199 configured to schedule an allocation of resources for sidelink transmission based on at least one of a destination ID or a sidelink collision report for the sidelink transmission; and provide, to a first UE, the allocation of resources for the sidelink transmission.

Although the following description may be focused on 5G NR, the concepts described herein may be applicable to other similar areas, such as LTE, LTE-A, CDMA, GSM, and other wireless technologies.

Figure 2:
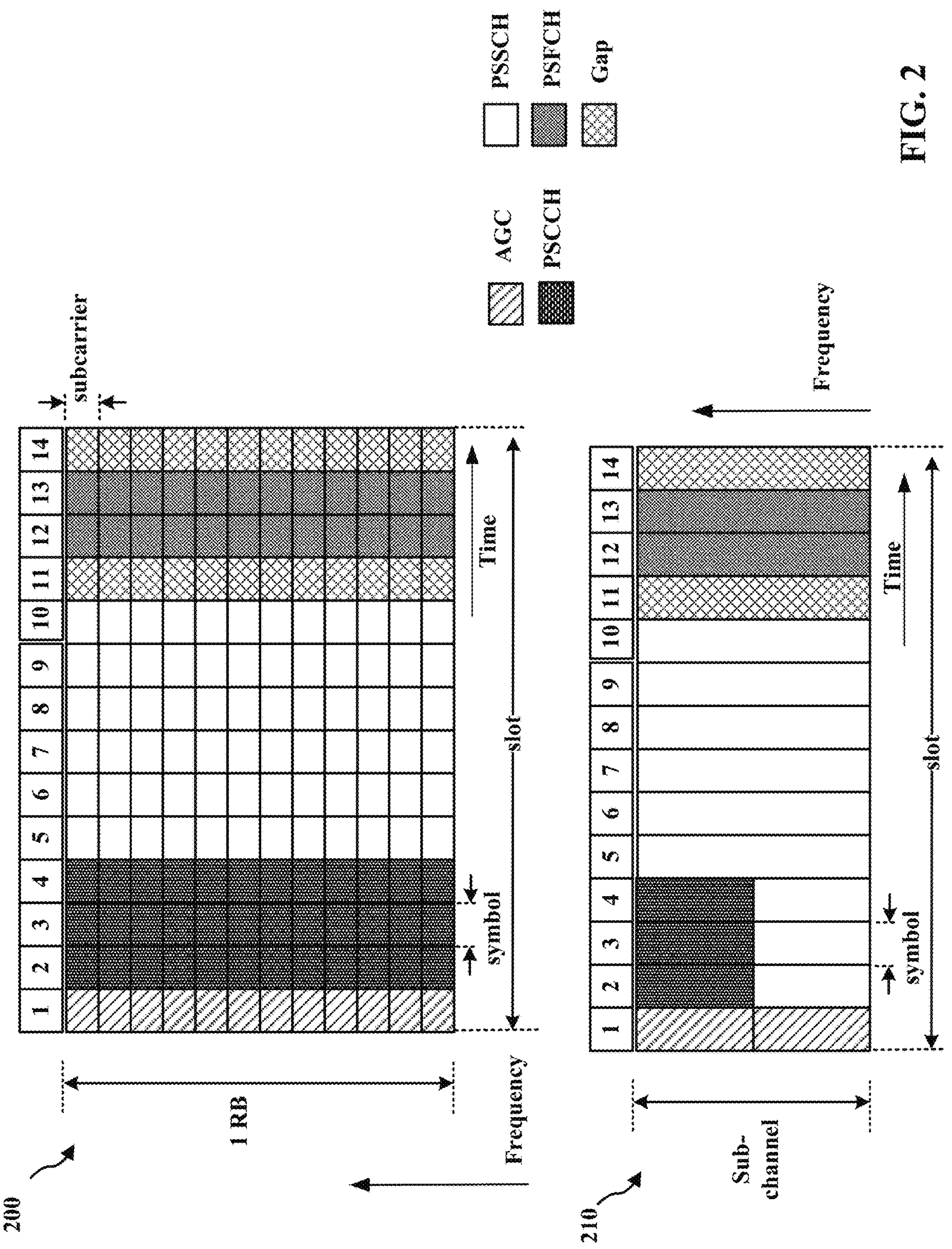
FIG. 2 illustrates example aspects of a sidelink slot structure.

FIG. 2 includes diagrams 200 and 210 illustrating example aspects of slot structures that may be used for sidelink communication (e.g., between UEs 104, RSU 407, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, a first symbol may include resources for automatic gain control (AGC) at a receiver. Some of the REs may include control information in PSCCH, and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
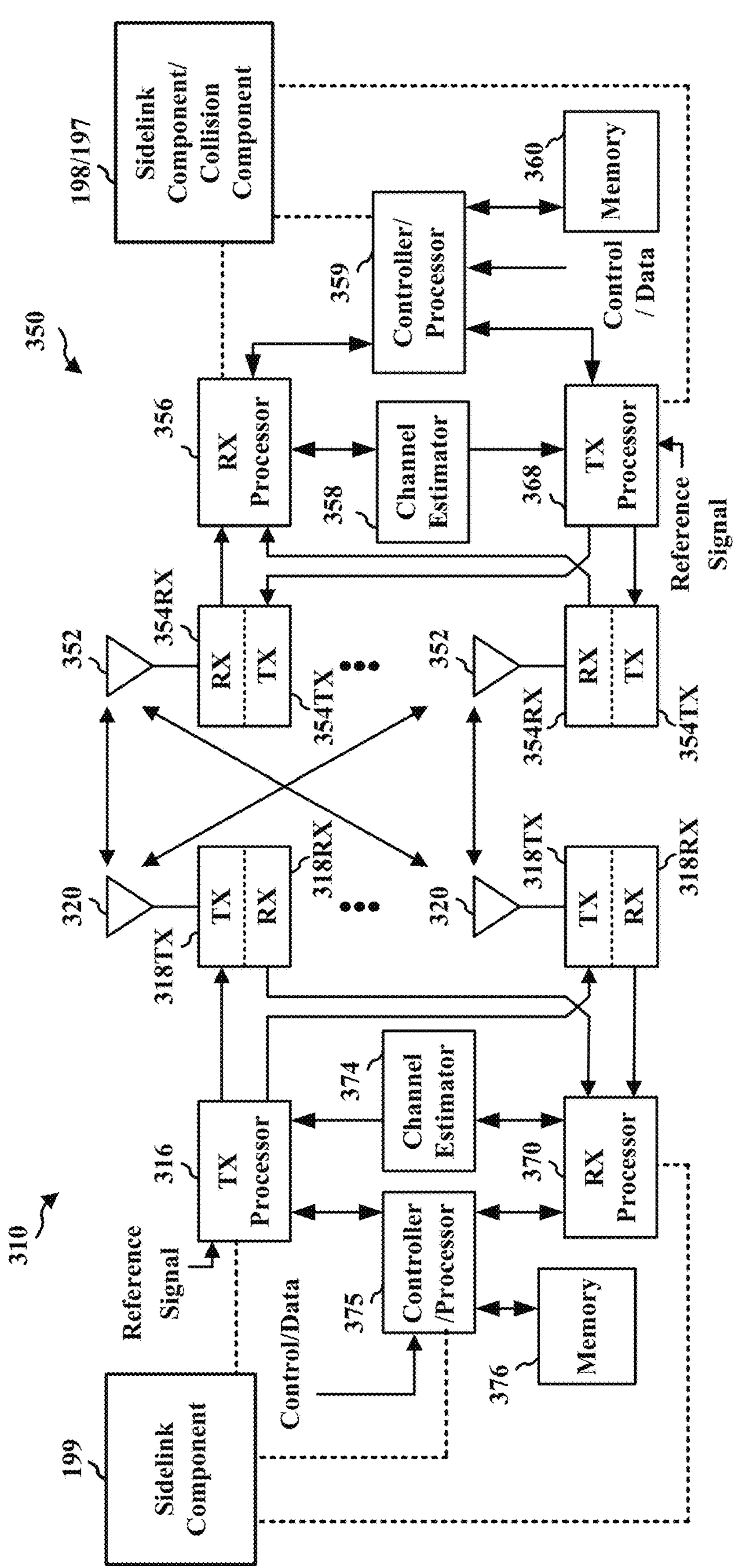
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate a radio frequency (RF) carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 197 of FIG. 1.

At least one of the TX processor 316, the RX processor 370, and the controller/processor 375 may be configured to perform aspects in connection with 199 of FIG. 1.

Figure 4:
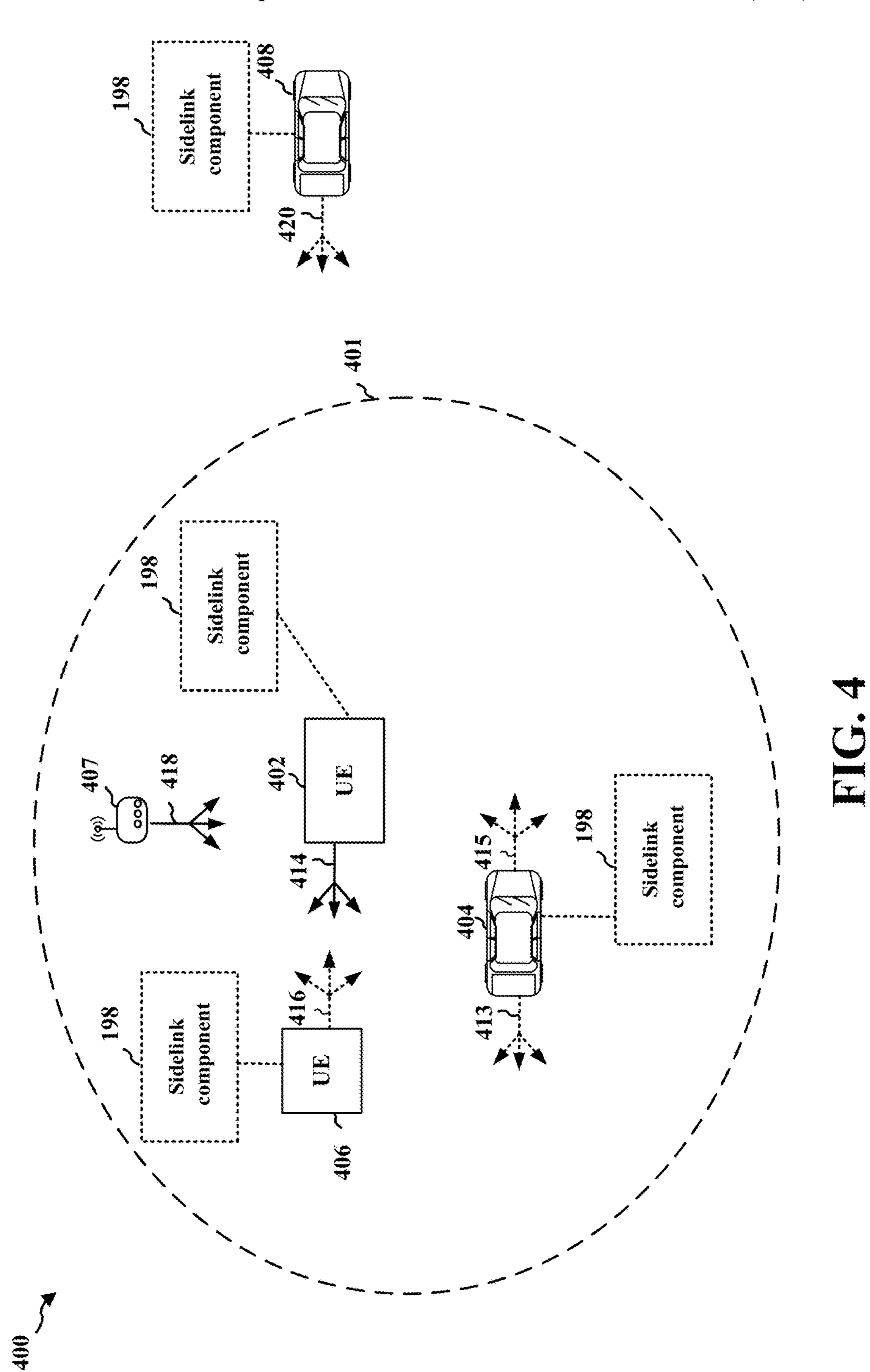
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmission 416. Additionally, or alternatively, the RSU 407 may receive communication from and/or transmit communication 418 to UEs 402, 404, 406, 408. One or more of the UEs 402, 404, 406, 408 or the RSU 407 may comprise a sidelink component 198 and/or a collision component 197 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figures 5A, 5B:
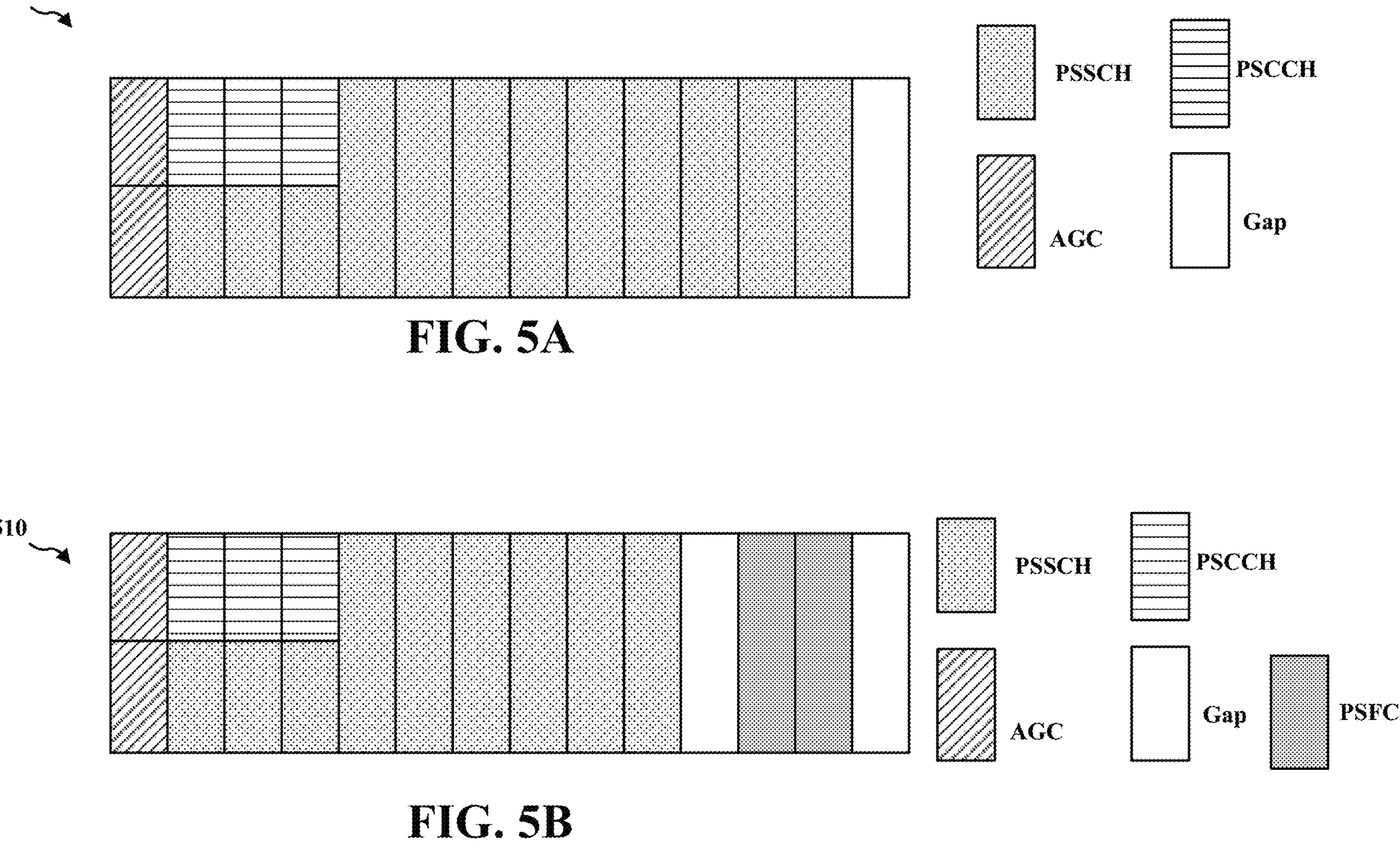
FIGS. 5A and 5B are diagrams illustrating examples of slots.

In wireless communication systems, a slot comprises 14 OFDM symbols, as shown in diagram 500 of FIG. 5A and diagram 510 of FIG. 5B. The first symbol may be repeated on a preceding symbol for automatic gain control (AGC) settling. In some instances, a gap symbol may be present after physical sidelink shared channel (PSSCH). A physical sidelink control channel (PSCCH) and PSSCH may be transmitted in the same slot. In some instances, a physical sidelink feedback channel (PSFCH) may be transmitted in the last two symbols of a slot.

In wireless communications systems, for example sidelink communication systems, a Mode 1 and Mode 2 resource allocation configuration may be utilized. For example, with reference to diagram 600 of FIG. 6A, in a Mode 1 resource allocation configuration, a base station 604 may allocate resources to a transmitting UE 602 for sidelink data channel transmission. The base station 604 may schedule the sidelink transmission for UE 602 via DCI format 3_0 with CRC scrambled with SL-RNTI. The UE 602 transmits PSCCH/PSSCH to the UE 606 in a slot determined by a time gap field in the scheduling DCI. The UE 602 may use HARQ information (e.g., HPID, NDI), FDRA, or TDRA in the scheduling DCI. The transmitting UE 602 may receive the allocated resources from the base station 604 over a Uu link. The transmitting UE 602 may transmit a sidelink transmission to the receiving UE 606 over a sidelink connection (e.g., PC5). If HARQ feedback is enabled, the transmitting UE 602 may receive HARQ feedback from the receiving UE 606 via PSFCH. The transmitting UE 602 may provide the HARQ feedback to the base station 604 via PUCCH resource indicated by the scheduling DCI.

Figure 6B:
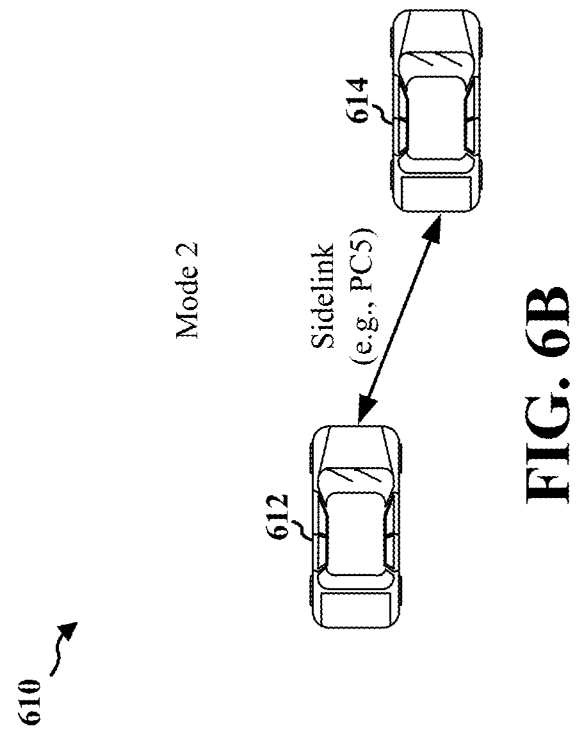
FIGS. 6A and 6B are diagrams of sidelink communication systems.
Figure 6A:
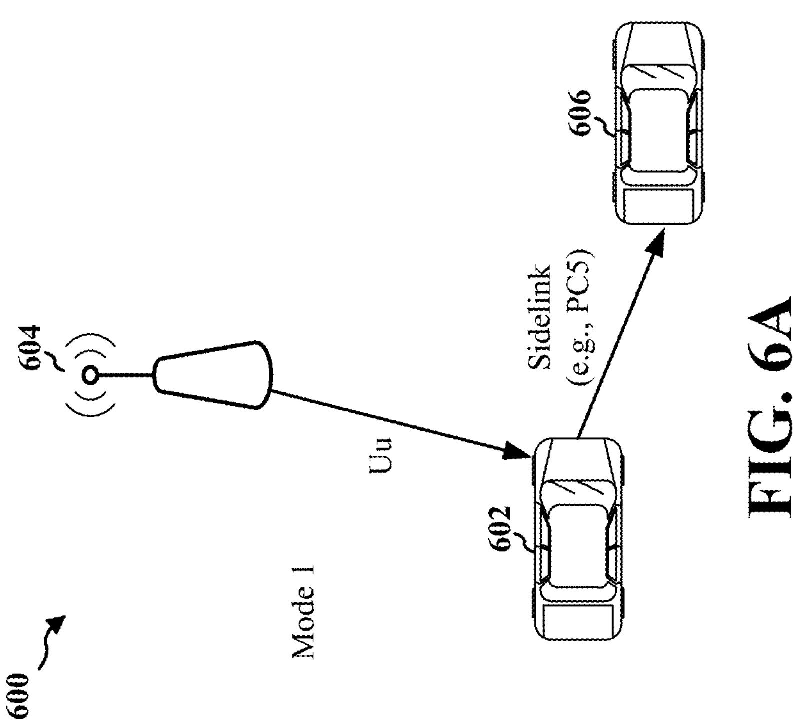

With reference to diagram 610 of FIG. 6B, in a Mode 2 resource allocation configuration, the transmitting UE 612 may perform resource allocation autonomously, on its own, for sidelink transmission with the receiving UE 614. Mode 2 may support reservation-based scheduling. The transmitting UE 612 may reserve a number of resources in a number of future slots for a future transmission. The reservation may be indicated in sidelink control information (SCI). The transmitting UE 612 may make the reservation based on monitoring of sidelink transmissions from other UEs.

In FR1, sidelink UEs may transmit and receive PSCCH/PSSCH with an omni-directional antenna, as shown in diagram 700 of FIG. 7. Sidelink transmission by a sidelink UE may be received by all sidelink UEs in the same area, as shown in FIG. 7. The base station (e.g., TRP1 or TRP2) may schedule sidelink transmissions from multiple sidelink UEs with orthogonal resources, such as in different slots or sub-channels to avoid collision among sidelink transmissions.

Figure 8:
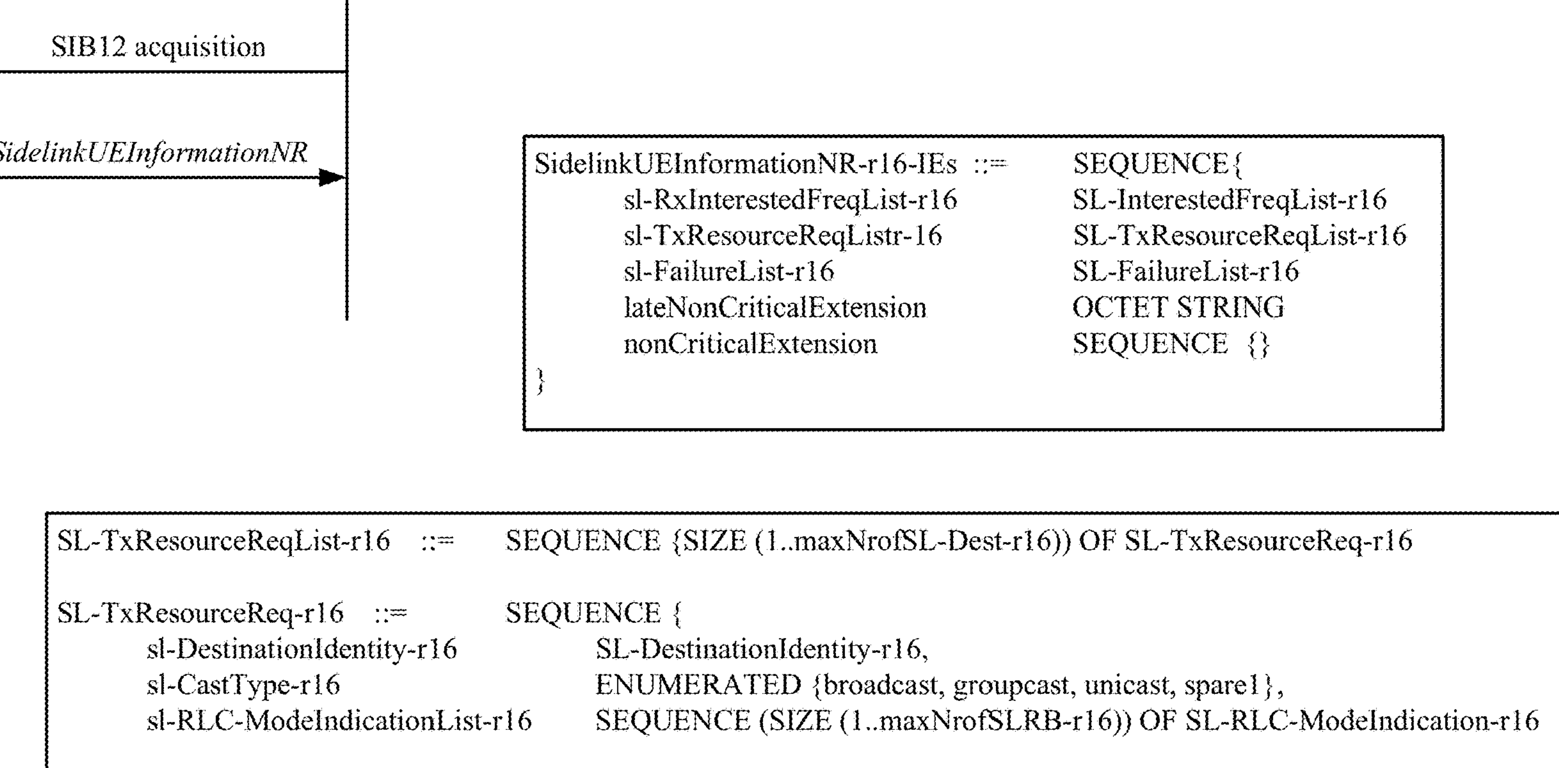
FIG. 8 is a diagram illustrating an example of reported sidelink information.

In some instances, a sidelink UE may indicate sidelink information (e.g., SidelinkUEInformationNR) to the network. The sidelink UE may indicate or transmit the sidelink information after reception of system information (e.g., SIB12), as shown in diagram 800 of FIG. 8. In some instances, the sidelink information may indicate sidelink destinations for sidelink transmission. The sidelink UE may indicate up to 32 sidelink destinations for sidelink transmission. As an example, the UE may provide a list or indexes for the destinations, e.g., such as in s1-TxResourceReqList-r16. The purpose of this procedure is to inform the network that the UE is interested or no longer interested to receive or transmit NR sidelink communication, is requesting assignment or release of transmission resource for NR sidelink communication, is reporting QoS parameters and QoS profile(s) related to NR sidelink communication, is reporting that a sidelink radio link failure or sidelink RRC reconfiguration failure has been detected, is reporting the sidelink UE capability information of the associated peer UE for unicast communication, or is reporting the RLC mode information of the sidelink data radio bearer(s) received from the associated peer UE for unicast communication.

In FR2 sidelink operation, sidelink UEs transmit and receive sidelink transmission with a beam. A beam pair may be established/maintained with a sidelink UE having a unicast connection. Some aspects presented herein help to enable accurate sidelink communication, e.g., such as unicast sidelink communication in FR2. With reference to diagram 900 of FIG. 9, UE1 and UE2 have established a sidelink connection, while UE3 and UE4 have established a sidelink connection, as well. The network (e.g., base station) may schedule sidelink transmission from UE1 to UE2 and sidelink transmission from UE4 to UE3 in the same slot/sub-channel. For parallel scheduling of multiple SL transmissions in the same slot/sub-channel, the network may know mutual collision between sidelink transmissions among different UE pairs. For example, if UE1 transmits a sidelink transmission to UE2, and UE3 transmits a sidelink transmission to UE4, there is a possibility for a collision to occur if the transmissions are at the same time and/or subchannel. In some instances, if UE4 transmits a sidelink transmission to UE3, and UE1 transmits a sidelink transmission to UE2, the possibility of a collision may be minimal due in part to a lack of beam power between UE4 and UE2. As discussed herein, every sidelink UE in the area can receive PSCCH/PSSCH due to a omni-antenna sidelink transmission/reception in FR1. It would be beneficial for the network to control beamforming of sidelink transmission to increase the opportunity of scheduling of parallel transmission with beamformed SL transmission/reception in FR2.

Aspects presented herein provide a configuration for an enhanced resource allocation for sidelink mode 1 operation. For example, the configuration may allow for a network to schedule multiple sidelink transmissions in a same slot and subchannel. The network may schedule the multiple sidelink transmissions based on at least one of a destination ID or a sidelink collision report for the sidelink transmission. The network may obtain information related to the destination ID from a transmitting UE, and may obtain information related to the sidelink collision report from a receiving UE.

In some aspects, mode 1 sidelink scheduling may be based on a destination ID. The scheduled sidelink resources may specify an enhanced resource allocation mode 1 in FR2 where the network (e.g., base station) schedules PSCCH/PSSCH to the sidelink UE with a destination ID for PSCCH/PSSCH transmission. For an omni-directional antenna or transmission, the DCI format 3_0 does not include an indication of destination ID, e.g., each UE in the area can receive a PSCCH or PSSCH. As presented herein, the destination ID may be indicated (e.g., by an index in s1-TxResourceReqList-r16 that the UE reported to the network) in sidelink information (e.g., such as SidelinkUEInformationNR). For beamformed sidelink communication, in comparison to omni-directional sidelink communication, the network may use the information about the destination to increase the opportunity for scheduling parallel transmissions based on beamforming control. The size of "destination ID" field in DCI format 3_0 may be determined based on the size of the list of destinations (e.g., the size of s1-TxResourceReqList-r16 or the amount of destinations indicated by the UE). The sidelink UE may be allowed to transmit PSCCH/PSSCH only to a sidelink UE associated with the indicated destination ID with corresponding transmit beamforming. In some aspects, the network may indicate a destination ID as "any" when there is no parallel sidelink scheduling. In such instances, any sidelink UE may receive the sidelink transmission if such sidelink UEs have a unicast connection or is paired with the transmitting UE.

In some aspects, mode 1 sidelink scheduling may be based on sidelink collision reporting with a destination ID. The a sidelink UE may report sidelink collision from the sidelink UE to network (e.g., base station) to assist scheduling of SL transmission. In some aspects, a new MAC-CE for sidelink collision reporting from the UE to the network may be utilized. The sidelink collision report from the sidelink UE may comprise at least one of resource pool associated with sidelink reception, target connection ID for intended sidelink reception, a list of K sidelink interfering UE information where each interfering UE information includes an interferer connection ID and interference level. In some instances, the network configures a maximum number of interfering UE information for sidelink collision reporting but the actual number of interfering UE information to be reported may be determined by the sidelink UE based on measurement. In some aspects, the target connection ID may be indicated by index in s1-TxResourceReqList-r16. In some aspects, the transmitter of target connection is the SL UE identified by s1-DestinationIdentity-r16.

Figure 10:
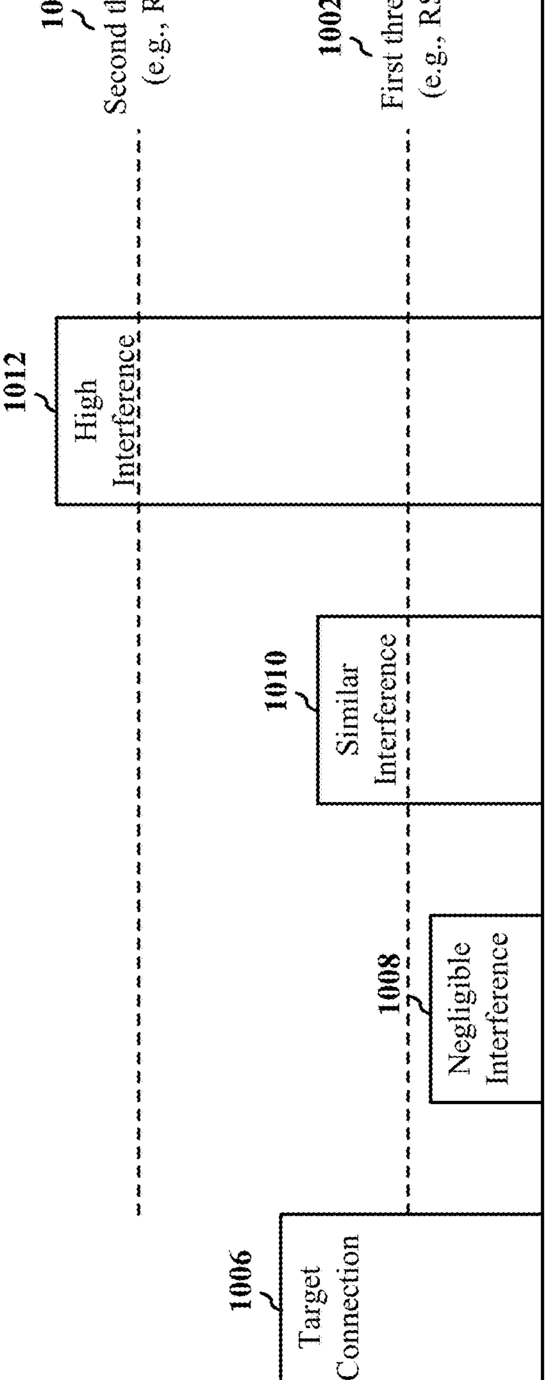
FIG. 10 is a diagram illustrating an example of interference levels for sidelink collision reporting.

In instances where enhanced resource allocation mode 1 is configured for a SL resource pool an interfering UE connection ID may be indicated by {source ID, destination ID} of the interfering UE sidelink transmission. Sidelink transmission from sidelink UE with "source ID" to the sidelink UE with "destination ID" may include the interfering UE connection. The level of interference may be indicated relative to a range having a first threshold 1002 and a second threshold 1004, as shown for example in diagram 1000 of FIG. 10. For example, the level of interference is indicated as one of below the first threshold, within the range between the first threshold and the second threshold, or above the second threshold. In some aspects, the interference level may be indicated as either "similar" or "high" in reference to the first and second threshold. For example, when the interference level is "similar" (e.g., 1010), the network may be expected to avoid scheduling of target connection and interfering connection in the same slot/subchannel. In instances when the interference level is "high" (e.g., 1012), the network may be expected to avoid scheduling of target connection and interfering connection in the same slot. In instances when the interference level is "negligible" (e.g., 1008), the UE (e.g., target connection 1006) may not include the interfering connection in SL collision report.

In some aspects, the sidelink collision report may not include the destination ID. In such instances, when resource allocation mode 1 is configured for a sidelink resource pool, an interfering connection ID may be indicated by a "source ID" of the interfering UE transmission. Any sidelink transmissions from sidelink UEs with a "source ID" may be considered to be an interfering connection. The interference level may be indicated as either "similar" or "high" as discussed above. When the interference level is "similar", the network may be expected to avoid scheduling of target connection and interfering connection in the same slot/subchannel. When the interference level is "high", the network may be expected to avoid scheduling of target connection and interference connection in the same slot. when the interference level is "negligible", the target UE does not report the interfering connection in sidelink collision report.

The sidelink collision report can be configured to be transmitted on a periodic basis or may be transmitted in response to a triggering event. Any change in interfering connection (e.g., interfering connection ID or interference level) may be an event that triggers transmission of the sidelink collision report. Sidelink collision reporting may be based on PSCCH-RSRP or PSSCH-RSRP. The destination UE or the UE that transmits the sidelink collision report may decode SCI2 to identify the source ID and destination ID of the received PSCCH/PSSCH. The threshold to determine the interference level is up to sidelink UE's decision. For example, a threshold for "negligible interferer" may be determined based on an acceptable interference level associated with the rank/MCS of the target connection. In another example, a threshold for "high interferer" may be determined based on AGC/quantization noise tolerance of sidelink UE receiver associated with the rank/MCS of the target connection.

Figure 11:
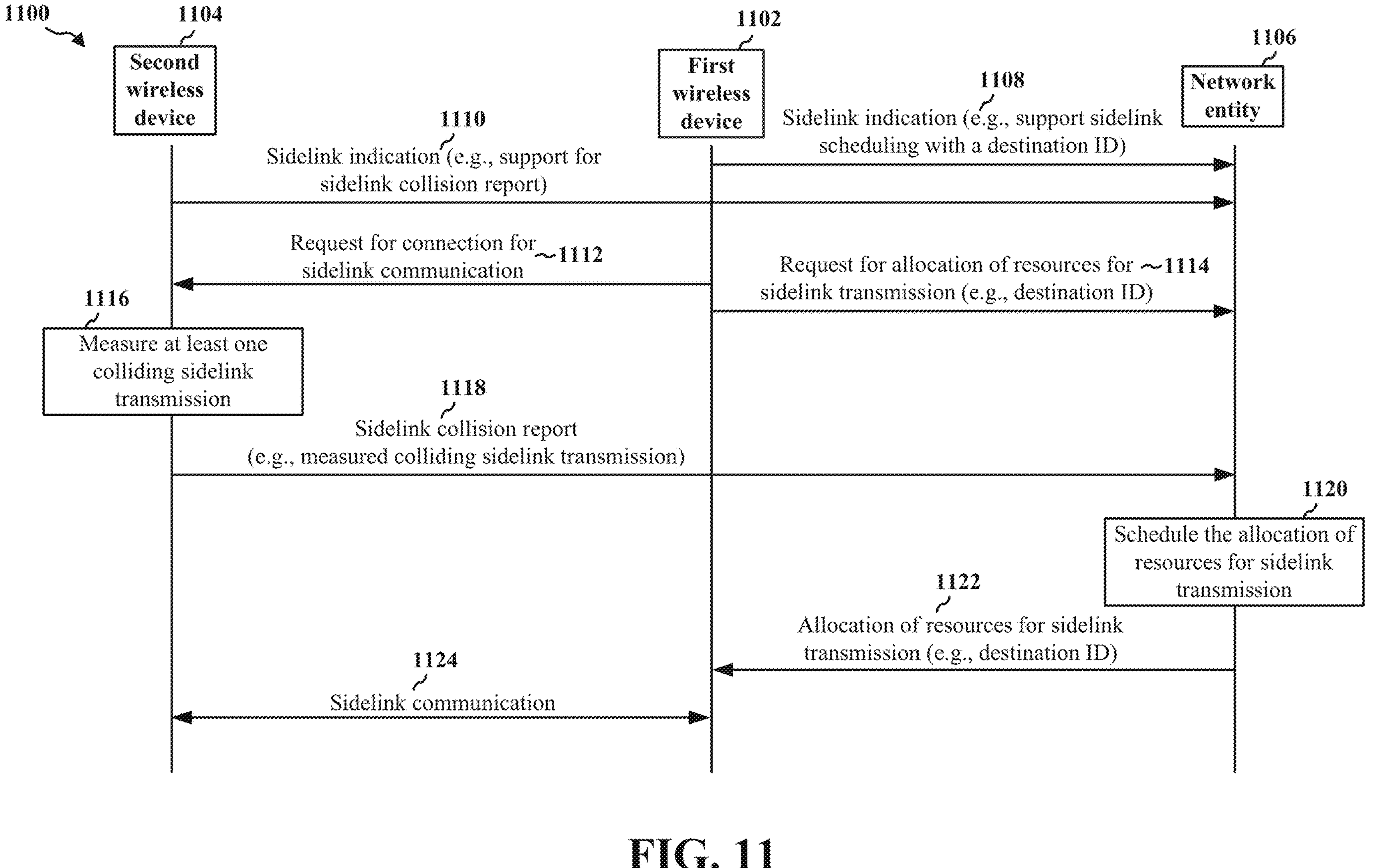
FIG. 11 is a call flow diagram of signaling between a first UE, a second UE, and a network entity.

FIG. 11 is a call flow diagram 1100 of signaling between a first wireless device 1102, a second wireless device 1104, and a network entity 1106. The first wireless device 1102 may be a first sidelink UE and the second wireless device 1104 may be a second sidelink UE. The first wireless device 1102 and the second wireless device 1104 may communicate with each other via sidelink communication. The first and second sidelink UEs may be configured to communicate with the network entity (e.g., base station). For example, in the context of FIG. 1, the first or second UE may each correspond to at least UE 104 and the network entity 1106 may correspond to base station 102. In another example, in the context of FIG. 3, the network entity 1106 may correspond to device 310 and the first or second UE may correspond to device 350.

At 1108, the first wireless device 1102 may transmit a sidelink indication to the network entity 1106. The network entity 1106 may obtain the sidelink indication from the first wireless device. The first wireless device may transmit the sidelink indication to the network entity prior to receiving an allocation of resources for a sidelink transmission. The sidelink indication may indicate support for at least sidelink scheduling with a destination ID of a second UE for the sidelink transmission.

At 1110, the second wireless device 1104 may transmit a sidelink indication to the network entity 1106. The network entity 1106 may obtain the sidelink indication from the second wireless device 1104. The sidelink indication, from the second wireless device, may indicate support for at least a sidelink collision report for sidelink transmission. In some aspects, a resource allocation mode 1 may be configured for a sidelink resource pool, the sidelink collision report may comprise a source ID of a colliding sidelink transmission from at least a different wireless device that may collide with a sidelink transmission from the first wireless device using the selected or intended resources. In some aspects, a level of interference may be based on at least one of a maximum RSRP from all sidelink transmissions from a sidelink wireless device associated with the source ID or an average RSRP from all sidelink transmissions from the sidelink wireless device associated with the source ID.

At 1112, the first wireless device 1102 may transmit, to the second wireless device 1104, a request to form a connection for sidelink communication, the second wireless device 1104 may receive the request to form the connection for the sidelink communication from the first wireless device 1102.

At 1114, the first wireless device 1102 may transmit, to the network entity 1106, a request for the allocation of resources for the sidelink transmission with the second wireless device 1104. The network entity 1106 may obtain the request for the allocation of resources for the sidelink transmission with the second wireless device, from the first wireless device. The request for the allocation of resources for the sidelink transmission may comprise the destination ID associated with the second wireless device. The first wireless device may transmit the request for the allocation of resources for the sidelink transmission with the second wireless device in response to transmitting, to the second wireless device, the request for sidelink communication with the second wireless device.

At 1116, the second wireless device 1104 may measure at least one colliding sidelink transmission from at least one additional or different wireless device interfering with a sidelink transmission from the first wireless device. The measured at least one colliding sidelink transmission may correspond to one or more anticipated collisions from at least one additional or different wireless device that may collide with the sidelink transmission from the first wireless device with the selected or intended resources for the sidelink transmission from the first wireless device.

At 1118, the second wireless device 1104 may transmit the sidelink collision report, to the network entity 1106, indicating the measured at least one colliding sidelink transmission from the at least one additional or different wireless device. The network entity 1106 may obtain the sidelink collision report from the second wireless device 1104. In some aspects, the sidelink collision report may comprise, for each of the at least one additional or different wireless devices, one or more of a connection ID associated with colliding sidelink communication, or a level of interference for the colliding sidelink communication. In some aspects, the sidelink collision report may comprise at least one of a resource pool associated with a sidelink reception at the second wireless device, or a target connection ID for a sidelink transmission from the first wireless device. In some aspects, the connection ID may comprise a source ID of the colliding sidelink transmission and a destination ID of a recipient of the colliding sidelink communication. In some aspects, the connection ID may comprise a source ID of the colliding sidelink transmission. In some aspects, a level of interference may be indicated based on relative RSRP value measured on a target connection and a colliding connection. The level of interference may be indicated relative to a range having a first threshold and a second threshold. The level of interference may be indicated as one of below the first threshold, within the range between the first threshold and the second threshold, or above the second threshold. In some aspects, transmission of the sidelink collision report may be periodic. In some aspects, transmission of the sidelink collision report may be an aperiodic report in response to a triggering event.

At 1120, the network entity 1106 may schedule the allocation of resources for sidelink transmission. The network entity 1106 may schedule the allocation of resources for the sidelink transmission based on at least one of the destination ID, obtained from the first wireless device 1102, or the sidelink collision report, obtained from the second wireless device 1104, for the sidelink transmission. In some aspects, the destination ID may indicate that the scheduled sidelink transmission is for a specific wireless device, such that the first wireless device transmits the sidelink transmission to a wireless device associated with the destination ID. In some aspects, the allocation of resources may comprise the destination ID of the second wireless device 1104. In some aspects, the destination ID may indicate that a scheduled sidelink transmission is for any sidelink wireless device with a unicast connection with the first wireless device.

At 1122, the network entity 1106 may provide the allocation of resources for the sidelink transmission to the first wireless device 1102. The first wireless device 1102 may receive the allocation of resources for the sidelink transmission from the network entity 1106.

At 1124, the first wireless device 1102 and the second wireless device 1104 may communicate with each other via sidelink communication. For example, the first wireless device 1102 may transmit the sidelink transmission to the second wireless device 1104 based on the allocation of resources for the sidelink transmission and the destination ID associated with the second wireless device. The second wireless device may receive the sidelink transmission from the first wireless device. In some aspects, the sidelink transmission with the second wireless device having the destination ID may be a beamformed transmission. The second wireless device 1104 may communicate with the first wireless device 1102 via the sidelink communication based on the allocation of resources for the sidelink transmission after transmission of the sidelink collision report to the network entity 1106.

Figure 12:
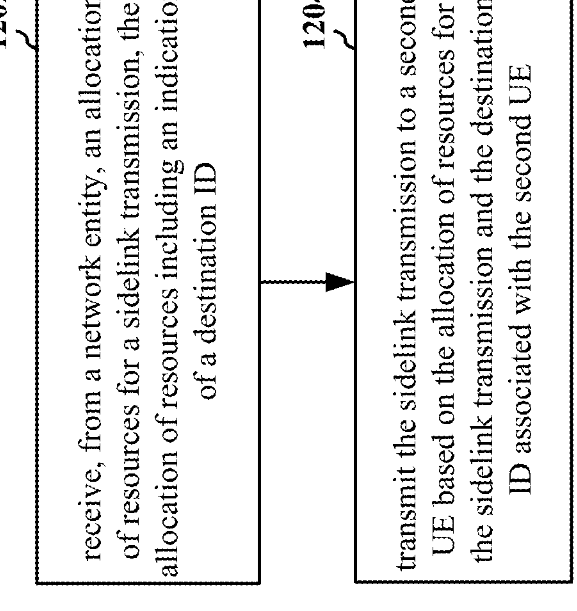
FIG. 12 is a flowchart of a method of wireless communication.

FIG. 12 is a flowchart 1200 of a method of wireless communication at a first UE. The method may be performed by a UE (e.g., the UE 104; the apparatus 1404). One or more of the illustrated operations may be omitted, transposed, or contemporaneous. The method may allow a UE to transit sidelink transmission with a second UE based on an allocation of resources for the sidelink transmission having a destination ID associated with the second UE.

At 1202, the first UE may receive an allocation of resources for a sidelink transmission. For example, 1202 may be performed by sidelink component 198 of apparatus 1404. The first UE may receive the allocation of resources for the sidelink transmission from a network entity. The allocation of resources may include an indication of a destination ID. In some aspects, the destination ID may indicate that the scheduled sidelink transmission is for a specific UE, such that the first UE transmits the sidelink transmission to the UE associated with the destination ID. In some aspects, the destination ID may indicate that a scheduled sidelink transmission is for any sidelink UE with a unicast connection with the first UE.

At 1204, the first UE may transmit the sidelink transmission to a second UE. For example, 1204 may be performed by sidelink component 198 of apparatus 1404. The first UE may transmit the sidelink transmission to the second UE based on the allocation of resources for the sidelink transmission and the destination ID associated with the second UE. In some aspects, the sidelink transmission with the second UE having the destination ID may be a beamformed transmission.

Figure 13:
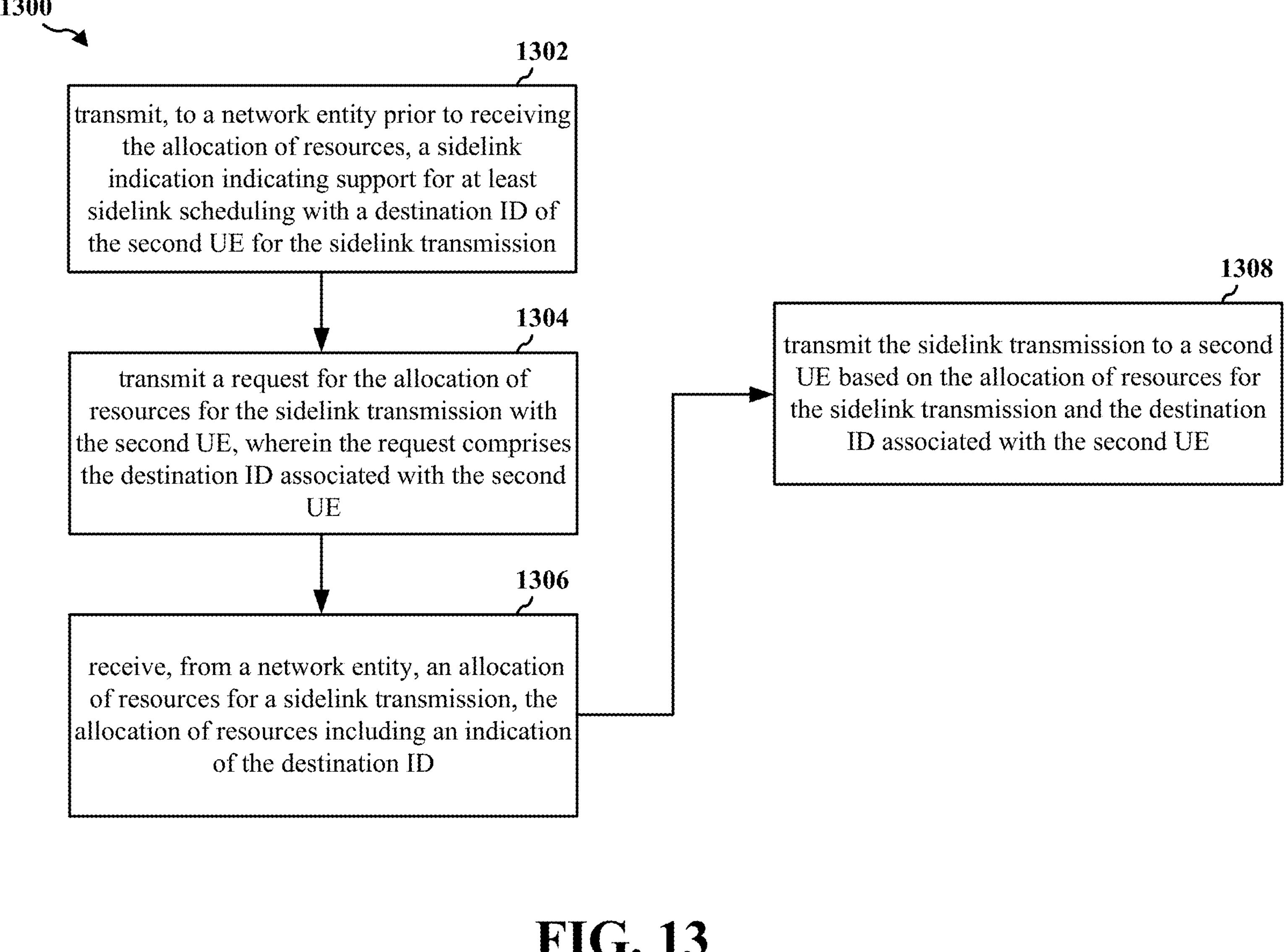
FIG. 13 is a flowchart of a method of wireless communication.

FIG. 13 is a flowchart 1300 of a method of wireless communication at a first UE. The method may be performed by a UE (e.g., the UE 104; the apparatus 1404). One or more of the illustrated operations may be omitted, transposed, or contemporaneous. The method may allow a UE to transit sidelink transmission with a second UE based on an allocation of resources for the sidelink transmission having a destination ID associated with the second UE.

At 1302, the first UE may transmit a sidelink indication to a network entity. For example, 1302 may be performed by sidelink component 198 of apparatus 1404. The UE may transmit the sidelink indication to the network entity prior to receiving an allocation of resources for a sidelink transmission. The sidelink indication may indicate support for at least sidelink scheduling with a destination ID of a second UE for the sidelink transmission.

At 1304, the first UE may transmit a request for the allocation of resources for the sidelink transmission with the second UE. For example, 1304 may be performed by sidelink component 198 of apparatus 1404. The request for the allocation of resources for the sidelink transmission may comprise the destination ID associated with the second UE. The first UE may transmit the request for the allocation of resources for the sidelink transmission with the second UE in response to transmitting, to the second UE, a request for sidelink communications with the second UE.

At 1306, the first UE may receive the allocation of resources for the sidelink transmission. For example, 1306 may be performed by sidelink component 198 of apparatus 1404. The first UE may receive the allocation of resources for the sidelink transmission from a network entity. The allocation of resources may include an indication of the destination ID. In some aspects, the destination ID may indicate that the scheduled sidelink transmission is for a specific UE, such that the first UE transmits the sidelink transmission to the UE associated with the destination ID. In some aspects, the destination ID indicates that a scheduled sidelink transmission is for any sidelink UE with a unicast connection with the first UE.

At 1308, the first UE may transmit the sidelink transmission to the second UE. For example, 1308 may be performed by sidelink component 198 of apparatus 1404. The first UE may transmit the sidelink transmission to the second UE based on the allocation of resources for the sidelink transmission and the destination ID associated with the second UE. In some aspects, the sidelink transmission with the second UE having the destination ID may be a beamformed transmission.

Figure 14:
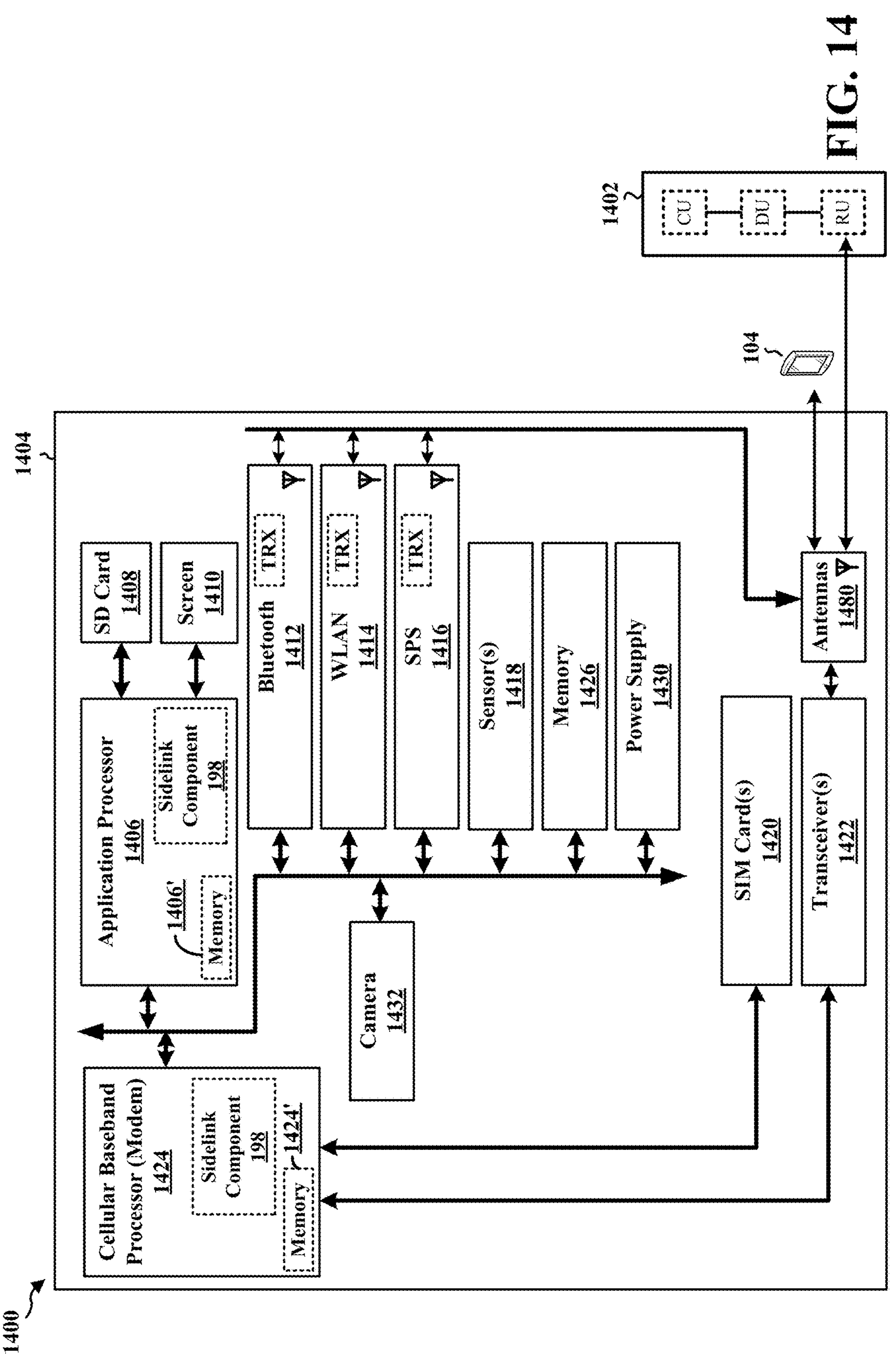
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor 1424/application processor 1406 when executing software. The cellular baseband processor 1424/application processor 1406 may be a component of the device 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to receive, from a network entity, an allocation of resources for a sidelink transmission, the allocation of resources including an indication of a destination ID; and transmit the sidelink transmission to a second UE based on the allocation of resources for the sidelink transmission and the destination ID associated with the second UE. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for receiving, from a network entity, an allocation of resources for a sidelink transmission, the allocation of resources including an indication of a destination ID. The apparatus includes means for transmitting the sidelink transmission to a second UE based on the allocation of resources for the sidelink transmission and the destination ID associated with the second UE. The apparatus further includes means for transmitting a request for the allocation of resources for the sidelink transmission with the second UE, wherein the request comprises the destination ID associated with the second UE. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
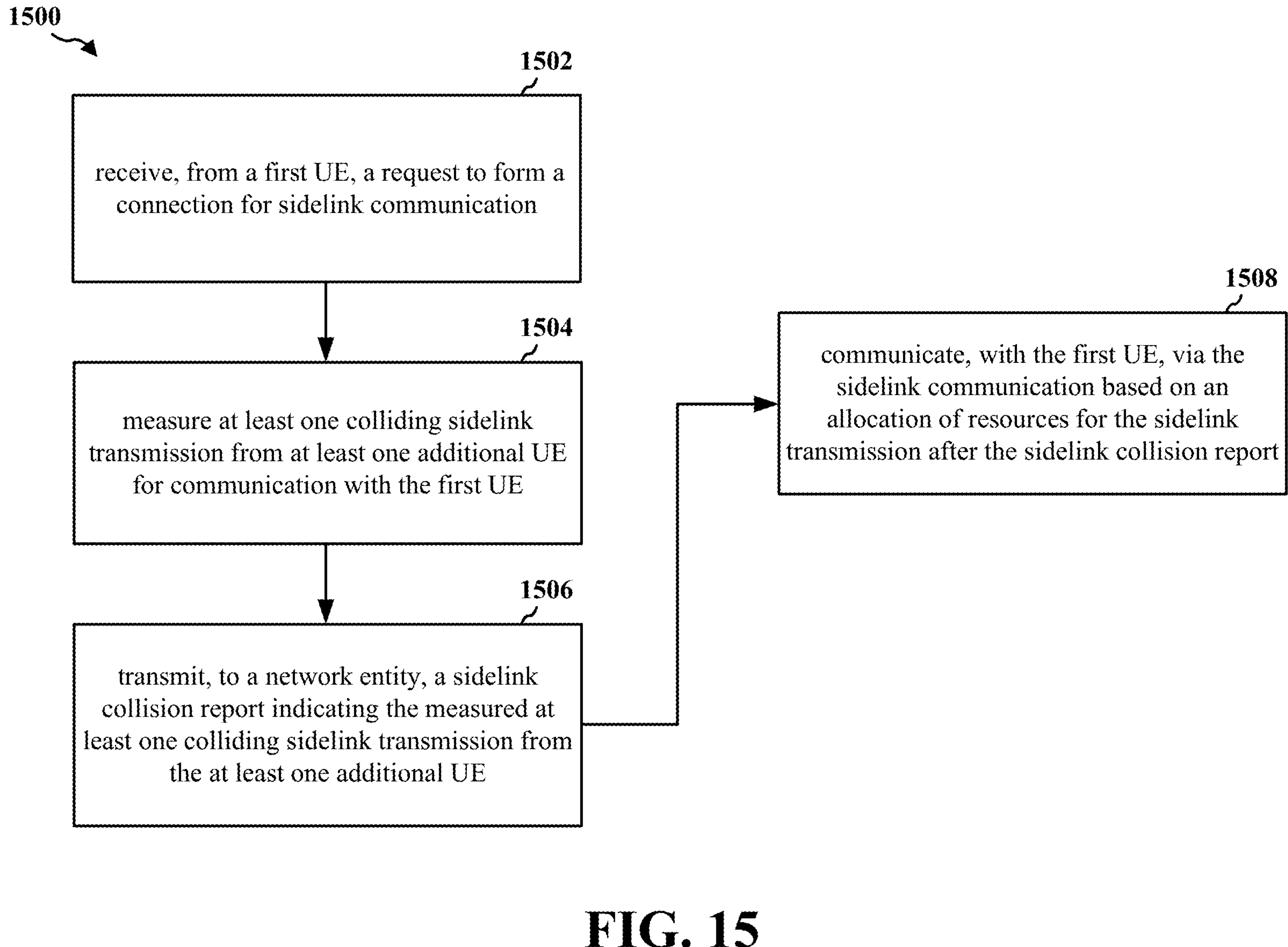
FIG. 15 is a flowchart of a method of wireless communication.

FIG. 15 is a flowchart 1500 of a method of wireless communication at a second UE. The method may be performed by a UE (e.g., the UE 104; the apparatus 1704). One or more of the illustrated operations may be omitted, transposed, or contemporaneous. The method may allow a UE to provide a sidelink collision report indicating at least one colliding sidelink transmission from other sidelink UEs.

At 1502, the second UE may receive a request to form a connection for sidelink communication. For example, 1502 may be performed by collision component 197 of apparatus 1704. The second UE may receive, from a first UE, the request to form the connection for the sidelink communication.

At 1504, the second UE may measure at least one colliding sidelink transmission. For example, 1504 may be performed by collision component 197 of apparatus 1704. The second UE may measure at least one colliding sidelink transmission from at least one additional UE interfering with the sidelink transmission from the first UE. The measured at least one colliding sidelink transmission may correspond to one or more anticipated collisions from at least one additional UE that may collide with the sidelink transmission from the first UE with the selected or intended resources for the sidelink transmission from the first UE.

At 1506, the second UE may transmit a sidelink collision report indicating the measured at least one colliding sidelink transmission from the at least one additional UE. For example, 1506 may be performed by collision component 197 of apparatus 1704. The second UE may transmit the sidelink collision report to a network entity. In some aspects, the sidelink collision report may comprise, for each of the at least one additional UE, one or more of a connection ID associated with colliding sidelink communication, or a level of interference for the colliding sidelink communication. In some aspects, the sidelink collision report may further comprise at least one of a resource pool associated with a sidelink reception at the second UE, or a target connection ID for a sidelink transmission from the first UE. In some aspects, the connection ID may comprise a source ID of the colliding sidelink transmission and a destination ID of a recipient of the colliding sidelink communication. In some aspects, the connection ID may comprise a source ID of the colliding sidelink transmission. In some aspects, a level of interference may be indicated based on relative RSRP value measured on a target connection and a colliding connection. The level of interference may be indicated relative to a range having a first threshold and a second threshold. The level of interference may be indicated as one of below the first threshold, within the range between the first threshold and the second threshold, or above the second threshold. In some aspects, transmission of the sidelink collision report may be periodic. In some aspects, transmission of the sidelink collision report may be an aperiodic report in response to a triggering event.

At 1508, the second UE may communicate via the sidelink communication. For example, 1508 may be performed by collision component 197 of apparatus 1704. The second UE may communicate with the first UE via the sidelink communication based on an allocation of resources for the sidelink transmission after transmission of the sidelink collision report.

Figure 16:
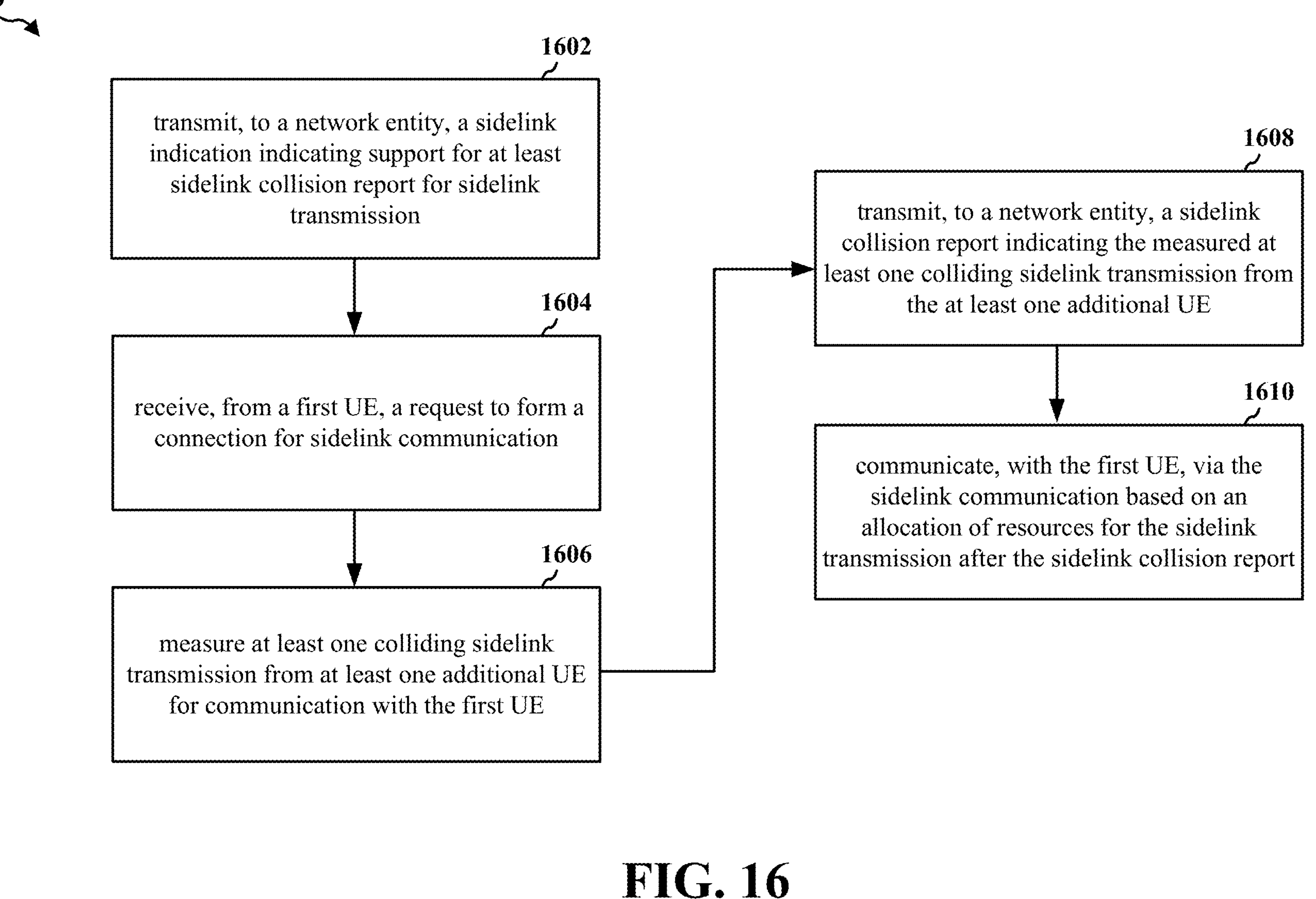
FIG. 16 is a flowchart of a method of wireless communication.

FIG. 16 is a flowchart 1600 of a method of wireless communication. The method may be performed by a UE (e.g., the UE 104; the apparatus 1704). One or more of the illustrated operations may be omitted, transposed, or contemporaneous. The method may allow a UE to provide a sidelink collision report indicating at least one colliding sidelink transmission from other sidelink UEs.

At 1602, the second UE may transmit a sidelink indication to a network entity. For example, 1602 may be performed by collision component 197 of apparatus 1704. The sidelink indication may indicate support for at least a sidelink collision report for sidelink transmission. In some aspects, a resource allocation mode 1 may be configured for a sidelink resource pool, the sidelink collision report may comprise a source ID of a colliding sidelink transmission. In some aspects, a level of interference may be based on at least one of a maximum RSRP from all sidelink transmissions from a sidelink UE associated with the source ID or an average RSRP from all sidelink transmissions from the sidelink UE associated with the source ID.

At 1604, the second UE may receive a request to form a connection for sidelink communication. For example, 1604 may be performed by collision component 197 of apparatus 1704. The second UE may receive, from a first UE, the request to form the connection for the sidelink communication.

At 1606, the second UE may measure at least one colliding sidelink transmission. For example, 1606 may be performed by collision component 197 of apparatus 1704. The second UE may measure at least one colliding sidelink transmission from at least one additional UE interfering with the sidelink transmission from the first UE. The measured at least one colliding sidelink transmission may correspond to one or more anticipated collisions from at least one additional UE that may collide with the sidelink transmission from the first UE with the selected or intended resources for the sidelink transmission from the first UE.

At 1608, the second UE may transmit a sidelink collision report indicating the measured at least one colliding sidelink transmission from the at least one additional UE. For example, 1608 may be performed by collision component 197 of apparatus 1704. The second UE may transmit the sidelink collision report to a network entity. In some aspects, the sidelink collision report may comprise, for each of the at least one additional UE, one or more of a connection ID associated with colliding sidelink communication, or a level of interference for the colliding sidelink communication. In some aspects, the sidelink collision report may further comprise at least one of a resource pool associated with a sidelink reception at the second UE, or a target connection ID for a sidelink transmission from the first UE. In some aspects, the connection ID may comprise a source ID of the colliding sidelink transmission and a destination ID of a recipient of the colliding sidelink communication. In some aspects, the connection ID may comprise a source ID of the colliding sidelink transmission. In some aspects, a level of interference may be indicated based on relative RSRP value measured on a target connection and a colliding connection. The level of interference may be indicated relative to a range having a first threshold and a second threshold. The level of interference may be indicated as one of below the first threshold, within the range between the first threshold and the second threshold, or above the second threshold. In some aspects, transmission of the sidelink collision report may be periodic. In some aspects, transmission of the sidelink collision report may be an aperiodic report in response to a triggering event.

At 1610, the second UE may communicate via the sidelink communication. For example, 1508 may be performed by collision component 197 of apparatus 1704. The second UE may communicate with the first UE via the sidelink communication based on an allocation of resources for the sidelink transmission after transmission of the sidelink collision report.

Figure 17:
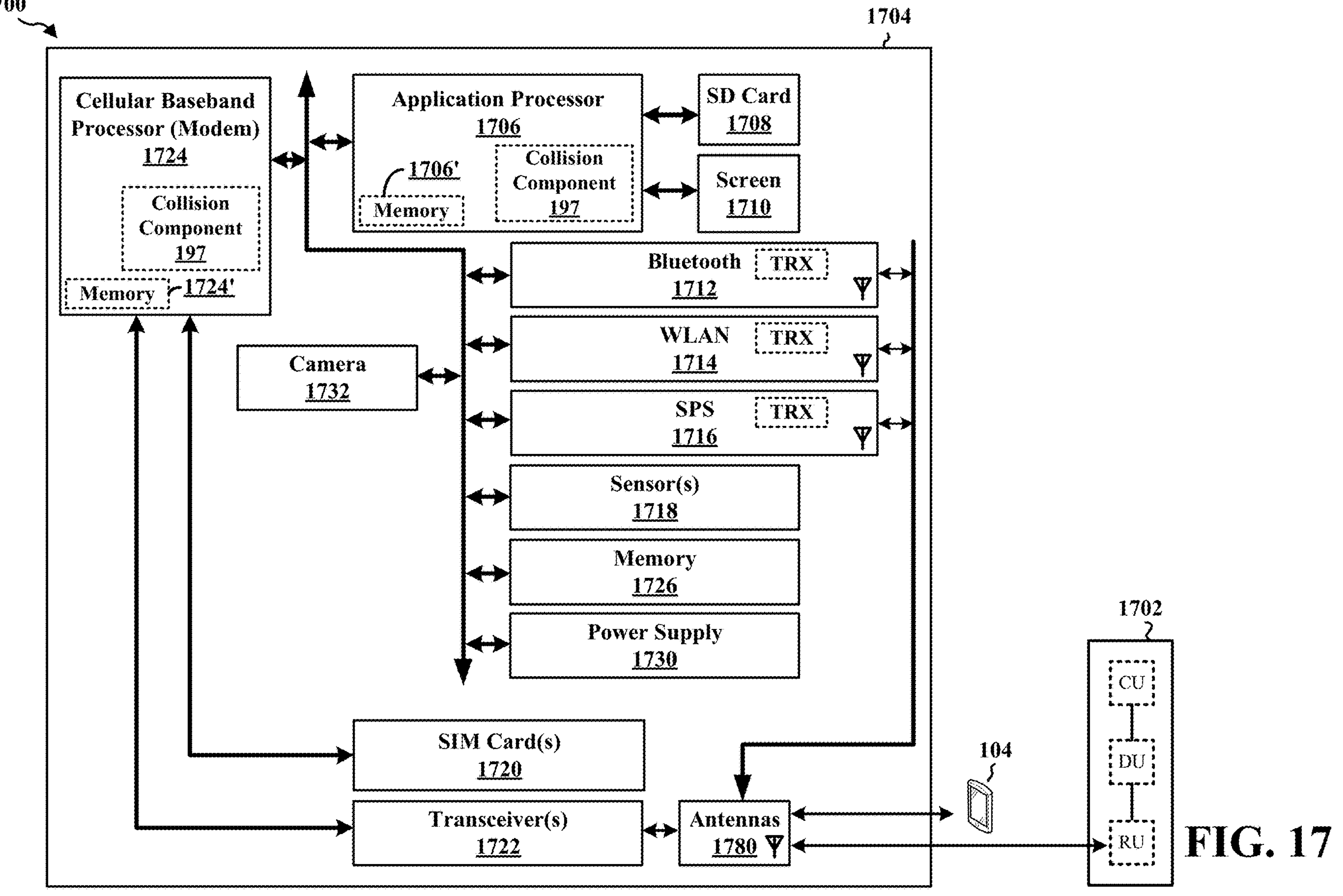
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The cellular baseband processor(s) 1724 and the application processor(s) 1706 are configured to perform the various functions described supra based at least in part of the information stored in the memory. That is, the cellular baseband processor(s) 1724 and the application processor(s) 1706 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor 1724/application processor 1706 when executing software. The cellular baseband processor 1724/application processor 1706 may be a component of the device 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the component 197 is configured to receive, from a first UE, a request to form a connection for sidelink communication; measure at least one colliding sidelink transmission from at least one additional UE interfering with the sidelink transmission from the first UE; transmitting, to a network entity, a sidelink collision report indicating the measured at least one colliding sidelink transmission from the at least one additional UE; and communicating, with the first UE, via the sidelink communication based on an allocation of resources for the sidelink transmission after the sidelink collision report. The component 197 may be within the cellular baseband processor 1724, the application processor 1706, or both the cellular baseband processor 1724 and the application processor 1706. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means receiving, from a first UE, a request to form a connection for sidelink communication. The apparatus includes means for measuring at least one colliding sidelink transmission from at least one additional UE interfering with the sidelink transmission from the first UE. The apparatus includes means for transmitting, to a network entity, a sidelink collision report indicating the measured at least one colliding sidelink transmission from the at least one additional UE. The apparatus includes means for communicating, with the first UE, via the sidelink communication based on an allocation of resources for the sidelink transmission after the sidelink collision report. The apparatus further includes means for transmitting, to a network entity, a sidelink indication indicating support for at least the sidelink collision report for sidelink transmission. The means may be the component 197 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
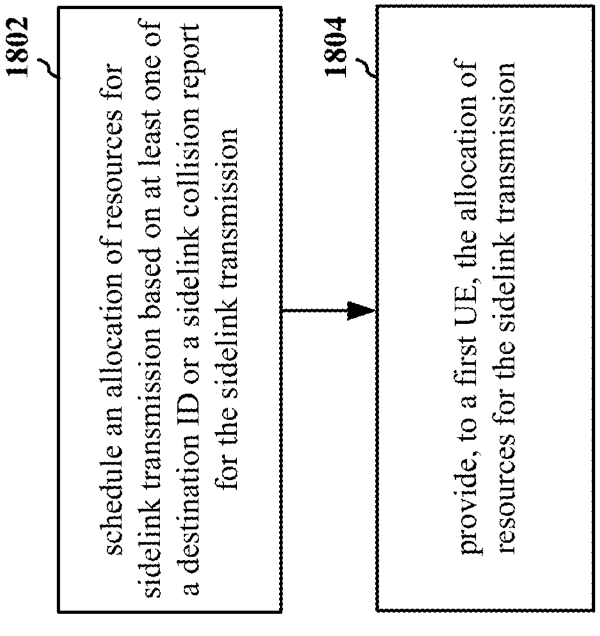
FIG. 18 is a flowchart of a method of wireless communication.

FIG. 18 is a flowchart 1800 of a method of wireless communication. The method may be performed by a base station (e.g., the base station 102; the network entity 1402, 1702, 2002). One or more of the illustrated operations may be omitted, transposed, or contemporaneous. The method may allow a network to schedule multiple sidelink transmissions in a same slot and subchannel.

At 1802, the network entity may schedule an allocation of resources for sidelink transmission. For example, 1802 may be performed by sidelink component 199 of network entity 2002. The network entity may schedule the allocation of resources for the sidelink transmission based on at least one of a destination ID or a sidelink collision report for the sidelink transmission. In some aspects, the destination ID may indicate that the scheduled sidelink transmission is for a specific UE, such that the first UE transmits the sidelink transmission to the UE associated with the destination ID. In some aspects, the allocation of resources may comprise the destination ID of a second UE. In some aspects, the destination ID may indicate that a scheduled sidelink transmission is for any sidelink UE with a unicast connection with the first UE.

At 1804, the network entity may provide the allocation of resources for the sidelink transmission. For example, 1804 may be performed by sidelink component 199 of network entity 2002. The network entity may provide the allocation of resource for the sidelink transmission to the first UE.

Figure 19:
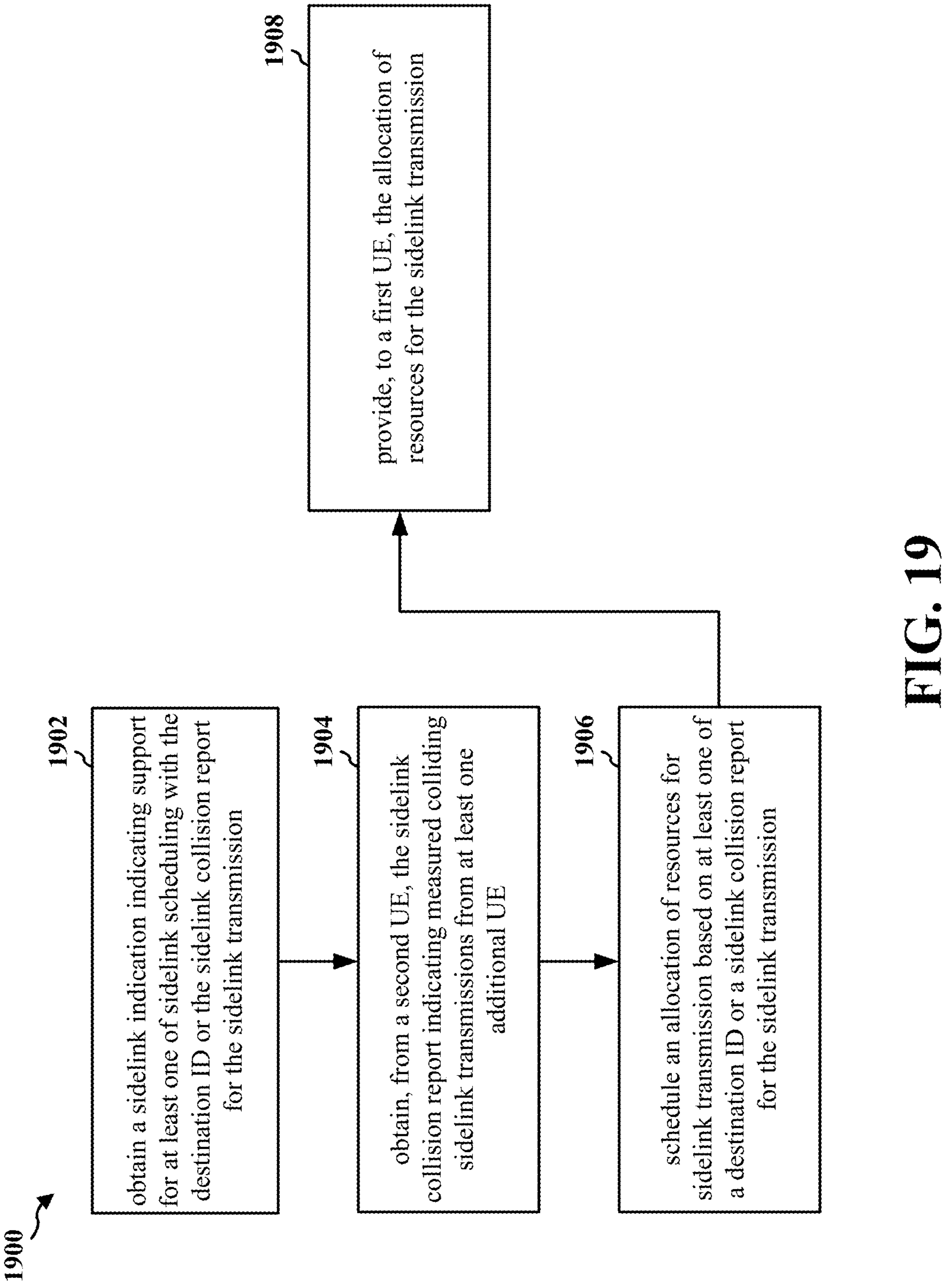
FIG. 19 is a flowchart of a method of wireless communication.

FIG. 19 is a flowchart 1900 of a method of wireless communication. The method may be performed by a base station (e.g., the base station 102; the network entity 1402, 1702, 2002). One or more of the illustrated operations may be omitted, transposed, or contemporaneous. The method may allow a network to schedule multiple sidelink transmissions in a same slot and subchannel.

At 1902, the network entity may obtain a sidelink indication. For example, 1902 may be performed by sidelink component 199 of network entity 2002. The sidelink indication may indicate support for at least one of sidelink scheduling with a destination ID or the sidelink collision report for the sidelink transmission.

At 1904, the network entity may obtain the sidelink collision report indicating measured colliding sidelink transmissions from at least one additional UE. For example, 1904 may be performed by sidelink component 199 of network entity 2002. The network entity may obtain the sidelink collision report from a second UE. The sidelink collision report may comprise, for each of the at least one additional UE, one or more of a connection ID associated with colliding sidelink communication, or a level of interference for the colliding sidelink communication. The sidelink collision report may further comprise at least one of a resource pool associated with the sidelink reception, or a target connection ID for the sidelink transmission from the first UE. The connection ID may comprise a source ID of a colliding sidelink transmission and the destination ID of a recipient of the colliding sidelink transmission. The connection ID may be based on a source ID of a colliding sidelink transmission.

At 1906, the network entity may schedule an allocation of resources for sidelink transmission. For example, 1906 may be performed by sidelink component 199 of network entity 2002. The network entity may schedule the allocation of resources for the sidelink transmission based on at least one of a destination ID or a sidelink collision report for the sidelink transmission. In some aspects, the destination ID may indicate that the scheduled sidelink transmission is for a specific UE, such that the first UE transmits the sidelink transmission to the UE associated with the destination ID. In some aspects, the allocation of resources may comprise the destination ID of a second UE. In some aspects, the destination ID may indicate that a scheduled sidelink transmission is for any sidelink UE with a unicast connection with the first UE.

At 1908, the network entity may provide the allocation of resources for the sidelink transmission. For example, 1908 may be performed by sidelink component 199 of network entity 2002. The network entity may provide the allocation of resource for the sidelink transmission to the first UE.

Figure 20:
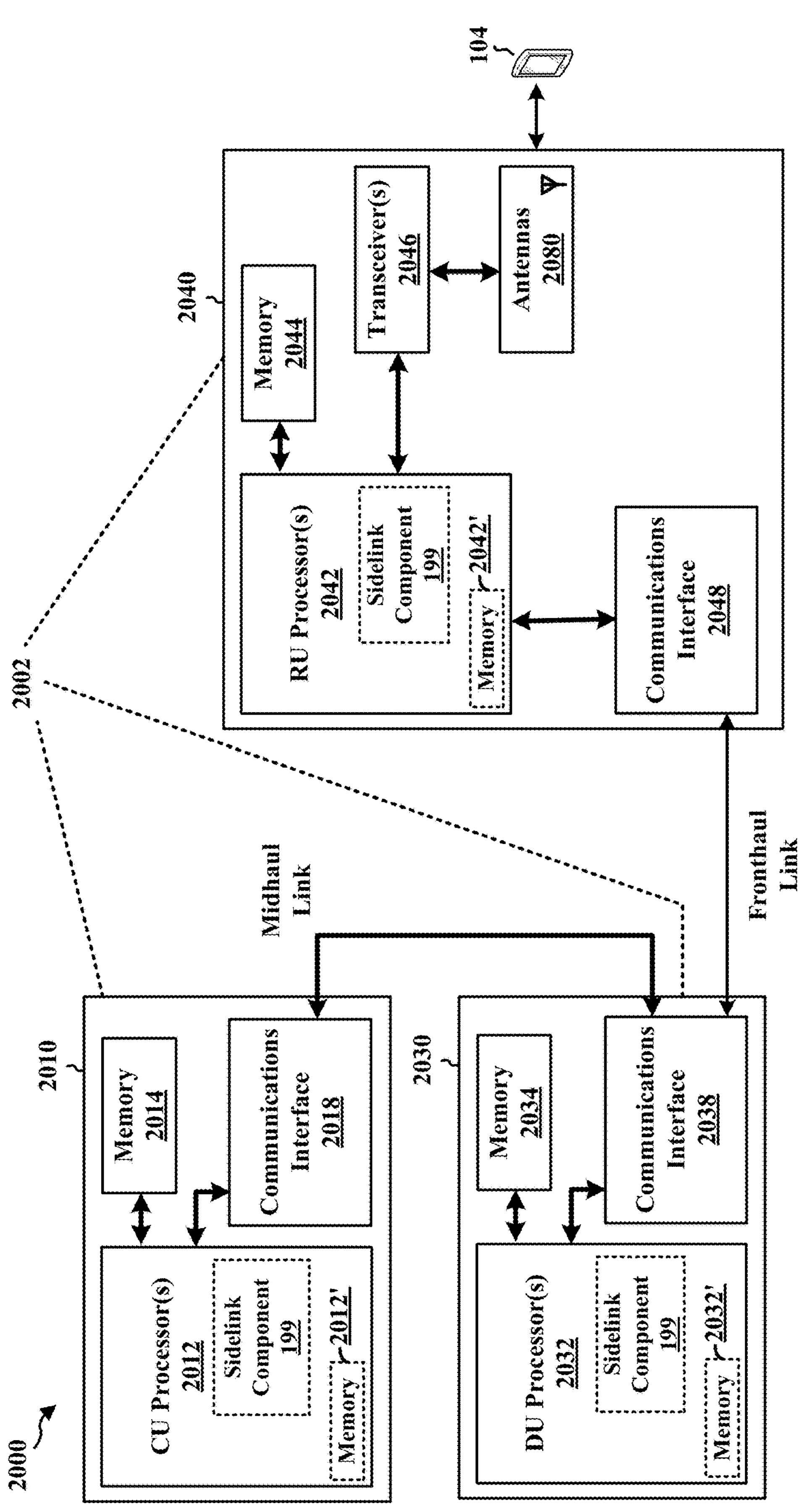
FIG. 20 is a diagram illustrating an example of a hardware implementation for an example network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, depending on the layer functionality handled by the component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include at least one CU processor 2012. The CU processor(s) 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include at least one DU processor 2032. The DU processor(s) 2032 may include on-chip memory 2032'. In some aspects, the DU 2030 may further include additional memory modules 2034 and a communications interface 2038. The DU 2030 communicates with the RU 2040 through a fronthaul link. The RU 2040 may include at least one RU processor 2042. The RU processor(s) 2042 may include on-chip memory 2042'. In some aspects, the RU 2040 may further include additional memory modules 2044, one or more transceivers 2046, antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to schedule an allocation of resources for sidelink transmission based on at least one of a destination ID or a sidelink collision report for the sidelink transmission; and provide, to a first UE, the allocation of resources for the sidelink transmission. The component 199 may be within one or more processors of one or more of the CU 2010, DU 2030, and the RU 2040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2002 may include a variety of components configured for various functions. In one configuration, the network entity 2002 may include means for scheduling an allocation of resources for sidelink transmission based on at least one of a destination ID or a sidelink collision report for the sidelink transmission. The network entity may include means for providing, to a first UE, the allocation of resources for the sidelink transmission. The network entity may further include means for obtaining a sidelink indication indicating support for at least one of sidelink scheduling with the destination ID or the sidelink collision report for the sidelink transmission. The network entity may further include means for obtaining, from a second UE, the sidelink collision report indicating measured colliding sidelink transmissions from at least one additional UE. The means may be the component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first user equipment (UE), comprising: receiving, from a network entity, an allocation of resources for a sidelink transmission, the allocation of resources including an indication of a destination identifier (ID); and transmitting the sidelink transmission to a second UE based on the allocation of resources for the sidelink transmission and the destination ID associated with the second UE.

In aspect 2, the method of aspect 1 further includes receiving, from the network entity, the allocation of resources for the sidelink transmission, the allocation of resources including the indication of the destination ID; and transmitting the sidelink transmission to the second UE based on the allocation of resources for the sidelink transmission and the destination ID associated with the second UE.

In aspect 3, the method of aspect 1 or aspect 2 further includes transmitting, to a network entity prior to receiving the allocation of resources, a sidelink indication indicating support for at least sidelink scheduling with the destination ID of the second UE for the sidelink transmission.

In aspect 4, the method of any of aspects 1-3 further includes transmitting a request for the allocation of resources for the sidelink transmission with the second UE, wherein the request comprises the destination ID associated with the second UE.

In aspect 5, the method of any of aspects 1-4 further includes that the sidelink transmission with the second UE having the destination ID is a beamformed transmission.

In aspect 6, the method of any of aspects 1-5 further includes that the destination ID indicates that a scheduled sidelink transmission is for any sidelink UE with a unicast connection with the first UE.

Aspect 7 is an apparatus for wireless communication at a UE, comprising: at least one memory; and at least one processor coupled to the at least one memory and, based at least in part on information stored in the at least one memory, the at least one processor, individually or in any combination, is configured to cause the UE perform the method of any of aspects 1-6.

Aspect 8 is an apparatus for wireless communication at a UE, comprising means for performing each step in the method of any of aspects 1-6.

Aspect 9 is the apparatus of any of aspects 7 or 8, further comprising a transceiver configured to receive or to transmit in association with the method of any of aspects 1-6.

Aspect 10 is a computer-readable medium (e.g., non-transitory) storing computer executable code at a UE, the code when executed by at least one processor causes the at least one processor to perform the method of any of aspects 1-6.

Aspect 11 is a method of wireless communication at a UE, including receiving, from a first UE, a request to form a connection for sidelink communication; measuring at least one colliding sidelink transmission from at least one additional UE interfering with a sidelink transmission from the first UE; transmitting, to a network entity, a sidelink collision report indicating the measured at least one colliding sidelink transmission from the at least one additional UE; and communicating, with the first UE, via the sidelink communication based on an allocation of resources for the sidelink transmission after the sidelink collision report.

In aspect 12, the method of aspect 11 further includes receiving, from the first UE, the request to form the connection for sidelink communication; transmitting, to the network entity, the sidelink collision report indicating the measured at least one colliding sidelink transmission from the at least one additional UE; and communicating, with the first UE, via the sidelink communication based on the allocation of resources for the sidelink transmission after the sidelink collision report.

In aspect 13, the method of aspect 11 or aspect 12 further includes transmitting, to a network entity, a sidelink indication indicating support for at least the sidelink collision report for sidelink transmission.

In aspect 14, the method of any of aspects 11-13 further includes that the sidelink collision report comprises, for each of the at least one additional UE, one or more of: a connection ID associated with colliding sidelink communication, or a level of interference for the colliding sidelink communication.

In aspect 15, the method of any of aspects 11-14 further includes that the sidelink collision report further comprises at least one of: a resource pool associated with a sidelink reception at the second UE; or a target connection ID for a sidelink transmission from the first UE.

In aspect 16, the method of aspect 14 or 15 further includes that the connection ID comprises a source ID of the colliding sidelink transmission and a destination ID of a recipient of the colliding sidelink communication.

In aspect 17, the method of aspect 14 or 15 further includes that the connection ID comprises a source ID of the colliding sidelink transmission.

In aspect 18, the method of aspect 14 further includes that a level of interference is indicated based on relative RSRP value measured on a target connection and a colliding connection.

In aspect 19, the method of aspect 18 further includes that the level of interference is indicated relative to a range having a first threshold and a second threshold, wherein the level of interference is indicated as one of: below the first threshold, within the range between the first threshold and the second threshold, or above the second threshold.

In aspect 20, the method of any of aspects 11-19 further includes that a resource allocation mode 1 is configured for a sidelink resource pool, the sidelink collision report comprises a source ID of a colliding sidelink transmission.

In aspect 21, the method of aspect 20 further includes that a level of interference is based on at least one of a maximum RSRP from all sidelink transmissions from a sidelink UE associated with the source ID or an average RSRP from all sidelink transmissions from the sidelink UE associated with the source ID.

In aspect 22, the method of any of aspects 11-21 further includes that the sidelink collision report is periodic.

In aspect 23, the method of any of aspects 11-21 further includes that the sidelink collision report is an aperiodic report in response to a triggering event.

Aspect 24 is an apparatus for wireless communication at a UE, comprising: at least one memory; and at least one processor coupled to the at least one memory and, based at least in part on information stored in the at least one memory, the at least one processor, individually or in any combination, is configured to cause the UE perform the method of any of aspects 11-23.

Aspect 25 is an apparatus for wireless communication at a UE, comprising means for performing each step in the method of any of aspects 11-23.

Aspect 26 is the apparatus of any of aspects 24 or 25, further comprising a transceiver configured to receive or to transmit in association with the method of any of aspects 11-23.

Aspect 27 is a computer-readable medium (e.g., non-transitory) storing computer executable code at a UE, the code when executed by at least one processor causes the at least one processor to perform the method of any of aspects 11-23.

Aspect 28 is a method of wireless communication at a network entity, including scheduling an allocation of resources for sidelink transmission based on at least one of a destination identifier (ID) or a sidelink collision report for the sidelink transmission; and providing, to a first user equipment (UE), the allocation of resources for the sidelink transmission.

In aspect 29, the method of aspect 28 further includes providing, to the first UE, the allocation of resources for the sidelink transmission.

In aspect 30, the method of aspect 28 or 29 further includes obtaining a sidelink indication indicating support for at least one of sidelink scheduling with the destination ID or the sidelink collision report for the sidelink transmission.

In aspect 31, the method of any of aspects 28-30 further includes that the allocation of resources comprises the destination ID of a second UE.

In aspect 32, the method of aspect 31 further includes that the destination ID indicates that a scheduled sidelink transmission is for any sidelink UE with a unicast connection with the first UE.

In aspect 33, the method of any of aspects 28-32 further includes obtaining, from a second UE, the sidelink collision report indicating measured colliding sidelink transmissions from at least one additional UE.

In aspect 34, the method of aspect 33 further includes that the sidelink collision report comprises, for each of the at least one additional UE, one or more of: a connection ID associated with colliding sidelink communication, or a level of interference for the colliding sidelink communication.

In aspect 35, the method of aspect 34 further includes that the sidelink collision report further comprises at least one of: a resource pool associated with the sidelink reception at the second UE; or a target connection ID for the sidelink transmission from the first UE.

In aspect 36, the method of aspect 34 further includes that the connection ID comprises a source ID of a colliding sidelink transmission and the destination ID of a recipient of the colliding sidelink transmission.

In aspect 37, the method of aspect 34 further includes that the connection ID is based on a source ID of a colliding sidelink transmission.

Aspect 38 is an apparatus for wireless communication at a network entity, comprising: at least one memory; and at least one processor coupled to the at least one memory and, based at least in part on information stored in the at least one memory, the at least one processor, individually or in any combination, is configured to cause the network entity to perform the method of any of aspects 28-37.

Aspect 39 is an apparatus for wireless communication at a network entity, comprising means for performing each step in the method of any of aspects 28-37.

Aspect 40 is the apparatus of any of aspects 38 or 39, further comprising a transceiver configured to receive or to transmit in association with the method of any of aspects 28-37.

Aspect 41 is a computer-readable medium (e.g., non-transitory) storing computer executable code at a network entity, the code when executed by at least one processor causes the at least one processor to perform the method of any of aspects 28-37.

What is claimed is:

1. An apparatus for wireless communication at a first user equipment (UE), comprising:

at least one memory; and at least one processor coupled to the at least one memory and, based at least in part on information stored in the at least one memory, the at least one processor, is configured to cause the first UE to:

receive, from a network entity, an allocation of resources for a sidelink transmission, wherein the allocation of resources includes an indication of a destination identifier (ID); and transmit the sidelink transmission to a second UE based on the allocation of resources for the sidelink transmission and the destination ID;

wherein the destination ID comprises one of:

a first destination ID that indicates that a scheduled sidelink transmission is for any sidelink UE with a unicast connection with the first UE; or a second destination ID associated with the second UE, wherein the at least one processor is configured to cause the first UE to transmit, to the network entity prior to reception of the allocation of resources, a sidelink indication that indicates support for at least sidelink scheduling with the second destination ID of the second UE for the sidelink transmission.

2. The apparatus of claim 1, further comprising a transceiver coupled to the at least one processor, wherein the at least one processor is configured to:

receive, from the network entity via the transceiver, the allocation of resources for the sidelink transmission, wherein the allocation of resources includes the indication of the destination ID; and transmit, via the transceiver, the sidelink transmission to the second UE based on the allocation of resources for the sidelink transmission and the destination.

3. The apparatus of claim 1, wherein the at least one processor is configured to cause the first UE to:

transmit a request for the allocation of resources for the sidelink transmission with the second UE, wherein the request comprises the second destination ID.

4. The apparatus of claim 1, wherein the sidelink transmission with the second UE is a beamformed transmission.

5. An apparatus for wireless communication at a network entity, comprising:

at least one memory; and at least one processor coupled to the at least one memory and, based at least in part on information stored in the at least one memory, the at least one processor is configured to cause the network entity to:

schedule an allocation of resources for sidelink transmission based on at least one of a destination identifier (ID) or a sidelink collision report for the sidelink transmission;

receive a sidelink indication that indicates support for at least one of sidelink scheduling with the destination ID or the sidelink collision report for the sidelink transmission; and provide, to a first user equipment (UE), the allocation of resources for the sidelink transmission.

6. The apparatus of claim 5, further comprising a transceiver coupled to the at least one processor, wherein the at least one processor is configured to:

transmit, to the first UE via the transceiver, the allocation of resources for the sidelink transmission.

7. The apparatus of claim 5, wherein the allocation of resources comprises the destination ID of a second UE.

8. The apparatus of claim 5, wherein the destination ID indicates that a scheduled sidelink transmission is for any sidelink UE with a unicast connection with the first UE.

9. The apparatus of claim 5, wherein the at least one processor is configured to cause the network entity to:

receive, from a second UE, the sidelink collision report that indicates measured colliding sidelink transmissions from at least one additional UE.

10. The apparatus of claim 9, wherein the sidelink collision report comprises, for each of the at least one additional UE, one or more of:

a connection ID associated with colliding sidelink communication, or a level of interference for the colliding sidelink communication.

11. The apparatus of claim 10, wherein the sidelink collision report further comprises at least one of:

a resource pool associated with sidelink reception at the second UE; or a target connection ID for the sidelink transmission from the first UE.

12. The apparatus of claim 10, wherein the connection ID comprises a source ID of a colliding sidelink transmission and the destination ID of a recipient of the colliding sidelink transmission.

13. The apparatus of claim 10, wherein the connection ID is based on a source ID of a colliding sidelink transmission.

14. A method of wireless communication at a first user equipment (UE), comprising:

receiving, from a network entity, an allocation of resources for a sidelink transmission, the allocation of resources including an indication of a destination identifier (ID); and transmitting the sidelink transmission to a second UE based on the allocation of resources for the sidelink transmission and the destination ID;

wherein the destination ID comprises one of:

a first destination ID that indicates that a scheduled sidelink transmission is for any sidelink UE with a unicast connection with the first UE; or a second destination ID associated with the second UE, wherein the method further comprises transmitting, to the network entity prior to reception of the allocation of resources, a sidelink indication that indicates support for at least sidelink scheduling with the the second destination ID of the second UE for the sidelink transmission.

15. The method of claim 14, further comprising:

receiving, from the network entity, the allocation of resources for the sidelink transmission, the allocation of resources including the indication of the destination ID; and transmitting the sidelink transmission to the second UE based on the allocation of resources for the sidelink transmission and the destination ID.

16. The method of claim 14, further comprising:

transmitting a request for the allocation of resources for the sidelink transmission with the second UE, wherein the request comprises the second destination ID.

17. The method of claim 14, wherein the sidelink transmission with the second UE is a beamformed transmission.

18. A method of wireless communication at a network entity, comprising:

scheduling an allocation of resources for sidelink transmission based on at least one of a destination identifier (ID) or a sidelink collision report for the sidelink transmission;

receive a sidelink indication that indicates support for at least one of sidelink scheduling with the destination ID or the sidelink collision report for the sidelink transmission; and providing, to a first user equipment (UE), the allocation of resources for the sidelink transmission.

19. The method of claim 18, further comprising:

transmitting, to the first UE, the allocation of resources for the sidelink transmission.

20. The method of claim 18, wherein the allocation of resources comprises the destination ID of a second UE.

21. The method of claim 18, wherein the destination ID indicates that a scheduled sidelink transmission is for any sidelink UE with a unicast:

connection with the first UE.

22. The method of claim 18, further comprising:

receiving, from a second UE, the sidelink collision report indicating measured colliding sidelink transmissions from at least one additional UE.

23. The method of claim 22, wherein the sidelink collision report comprises, for each of the at least one additional UE, one or more of:

a connection ID associated with colliding sidelink communication, or a level of interference for the colliding sidelink communication.

24. The method of claim 23, wherein the sidelink collision report further comprises at least one of:

a resource pool associated with sidelink reception at the second UE; or a target connection ID for the sidelink transmission from the first UE.

* * * * *